US012639083B2

(12) United States Patent
Makhija et al.

(10) Patent No.: US 12,639,083 B2
(45) Date of Patent: May 26, 2026

(54) UI FRAMEWORK FOR REAL TIME RESTRUCTURING OF ENTERPRISE APPLICATION

(71) Applicant: NB Ventures, Inc., Clark, NJ (US)

(72) Inventors: Subhash Makhija, Westfield, NJ (US); Huzaifa Shabbir Matawala, East Brunswick, NJ (US); Wael Gendy Yousef Abdo, Bridgewater, NJ (US); John Fawzy Gouda Hakeem, Carteret, NJ (US)

(73) Assignee: NB Ventures, Inc.

( * ) Notice: Subject to any disclaimer, the term of this patent is extended or adjusted under 35 U.S.C. 154(b) by 1070 days.

(21) Appl. No.: 17/727,064

(22) Filed: Apr. 22, 2022

(65) Prior Publication Data

US 2022/0253322 A1 Aug. 11, 2022

Related U.S. Application Data

(62) Division of application No. 16/674,035, filed on Nov. 5, 2019, now Pat. No. 11,354,140.

(51) Int. Cl.
| | |
|---|---|
| *G06F 9/451* | (2018.01) |
| *G06F 3/0482* | (2013.01) |
| *G06F 3/0484* | (2022.01) |
| *G06F 9/445* | (2018.01) |
| *G06F 9/54* | (2006.01) |
| *G06N 20/00* | (2019.01) |
| *G06Q 10/08* | (2024.01) |

(52) U.S. Cl.
CPC ............ *G06F 9/451* (2018.02); *G06F 3/0482* (2013.01); *G06F 3/0484* (2013.01); *G06F*

*9/44521* (2013.01); *G06F 9/54* (2013.01); *G06N 20/00* (2019.01); *G06Q 10/08* (2013.01)

(58) Field of Classification Search
CPC ...... G06F 9/451; G06F 3/0482; G06F 3/0484; G06F 9/44521; G06F 9/54; G06N 20/00; G06Q 10/08
See application file for complete search history.

(56) References Cited

U.S. PATENT DOCUMENTS

| | | | |
|---|---|---|---|
| 2015/0120397 A1* | 4/2015 | Vissapragada ....... | G06Q 10/067 705/7.36 |
| 2019/0362022 A1* | 11/2019 | Haukioja ................ | G10L 15/04 |
| 2022/0244972 A1* | 8/2022 | Makhija ................ | G06F 3/0482 |
| 2022/0253323 A1* | 8/2022 | Makhija .................. | G06F 9/54 |

* cited by examiner

*Primary Examiner* — Kevin L Young
*Assistant Examiner* — Kimberly L Jordan
(74) *Attorney, Agent, or Firm* — David M. Breiner; BrownWinick Law Firm

(57) ABSTRACT

The present invention provides a system and method for restructuring of an enterprise application (EA) or a supply chain management (SCM) application. The system and method enable a user to restructure the applications dynamically by operating with configurable user interface components without a need to involve a developer for coding. The system includes a platform layer component and a data layer component associated with UI component for executing a task. The system further includes a rule engine configured to interact with a dynamic module injector for conditionally loading modules on the user interface for restructuring the applications thereby redefining EA and SCM operations.

20 Claims, 19 Drawing Sheets

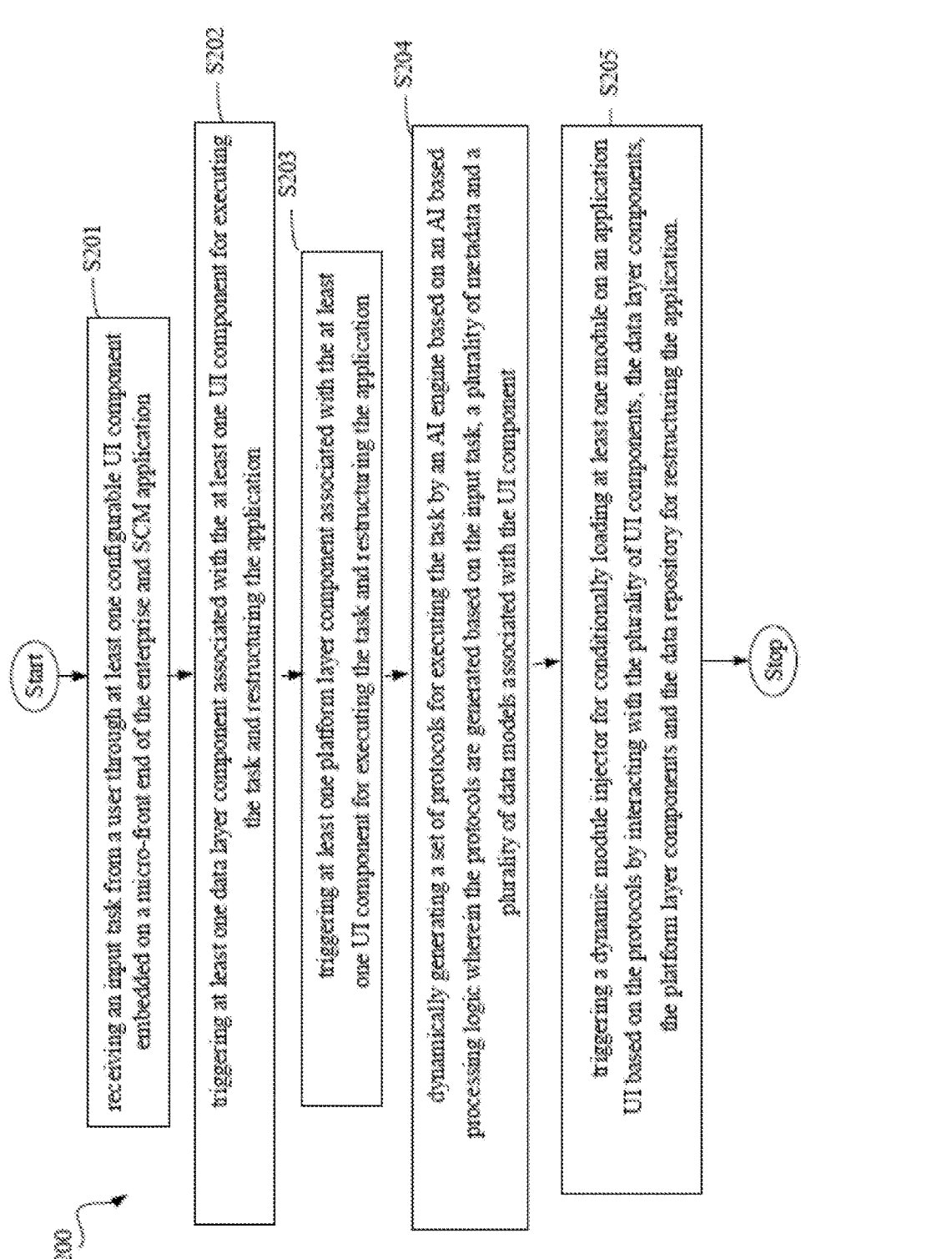

S201 receiving an input task from a user through at least one configurable UI component embedded on a micro-front end of the enterprise and SCM application

S202 triggering at least one data layer component associated with the at least one UI component for executing the task and restructuring the application

S203 triggering at least one platform layer component associated with the at least one UI component for executing the task and restructuring the application

S204 dynamically generating a set of protocols for executing the task by an AI engine based on an AI based processing logic wherein the protocols are generated based on the input task, a plurality of metadata and a plurality of data models associated with the UI component

S205 triggering a dynamic module injector for conditionally loading at least one module on an application UI based on the protocols by interacting with the plurality of UI components, the data layer components, the platform layer components and the data repository for restructuring the application

FIG. 2

UI FRAMEWORK FOR REAL TIME RESTRUCTURING OF ENTERPRISE APPLICATION

CROSS REFERENCE TO RELATED APPLICATION

This Application is a divisional of U.S. Utility application Ser. No. 16/674,035 which was filed with the United States Patent and Trademark Office on Nov. 5, 2019, the entire contents of which are herein incorporated by reference.

BACKGROUND

1. Technical Field

This disclosure relates generally to enterprise applications (EA) and supply chain management (SCM) applications. More particularly, this disclosure relates to system and method for real-time restructuring of one or more applications including enterprise resource planning (ERP) and supply chain management (SCM) applications.

2. Description of the Prior Art

Enterprise applications (EA) and supply chain management (SCM) applications plays a significant role for controlling various important functions in any organization. Such applications include various servers, databases, and computer-based systems for managing several internal and external aspects of an organization's enterprise level and supply chain level data management requirements. The requirements may be in diverse areas such as finance, sales, logistics, asset, purchasing, and inventory, among others.

Transformation or change of process in enterprise application and supply chain management application is common. However, traditional systems are typically dedicated for performing limited functions as structured by the system or service provider with limited operational behaviors and features. Major feature and behavior changes to traditional systems require significant development efforts. Systems that are created to be flexible require extensive custom development work to meet custom requirements.

Further, over the years there has been a shift from client-server systems to SAAS or cloud-based systems that are deployed to meet the operational requirements of an organization. While, the client-Server systems typically provide more feature rich interface and wider range of compatible hardware, the SAAS based system are difficult to implement dynamic changes due to un-stretchable nature of the architecture of the SAAS platform. Moreover, for EA and SCM applications the operational behavior and dynamic extension of functional processes makes it even more difficult to configure systems implemented on cloud-based environment.

The Frequency and scope of changes required in operational processes and its impact to enterprise applications is increasing. Transformation in operational process in enterprises of all types and sizes can be due to various reasons like Mergers and acquisitions, compliance and security requirements, radical delivery change, different operational or functional model etc. The EA and SCM applications have direct impact due to such transformation. The applications need to innovate and adopt such transformational changes at different levels. Current applications overtime has become rigid and inflexible to such transformational changes. It does not have the capability to support dynamic nature of operational requirement. The time required to incorporate changes has increased and organizational teams are not able to yield benefits of technology where overall objective is to have improved efficiency.

Connecting demand with the supply chain in a dynamically changing environment within enterprise resources planning is a big problem as every organization utilizes different configuration to meet their operational requirements. To facilitate different configuration for distinct organizations in real time is extremely cumbersome requiring technical modifications to the complex structural architecture of the existing ERP and SCM applications. Further, real time collaboration among players such as customers, distributors, warehouses, factories, and suppliers may be structured differently by organizations.

Also, every function in an ERP or SCM system requires specific process or rule to carry out the task. The type and characteristic of data utilized for carrying out these functions is different for different tasks. Due to inherent structural and architectural limitations, the existing systems are unable to pre-empt all issues arising out of an ERP or SCM system and devise a solution. Further, User interface (UI) of the current ERP and SCM applications are not equipped to handle dynamic changes in the functions, parameters considered to carry out the functions and data flowing through the application.

Accordingly, there is a need in the art for improved supply chain management (SCM) and ERP system applications that are dynamically configurable by an organization as per their needs without requiring a service provide to carry out whole sale changes to meet the requirement. More so, in an environment where the application supports multiple organizations with varying requirements through the same SAAS platform.

SUMMARY OF THE INVENTION

Accordingly, this disclosure provides a system for real time restructuring of enterprise and/or Supply chain management (SCM) application. The system includes a plurality of configurable UI components embedded on a micro-front end of the enterprise and SCM application, a plurality of data layer components and a plurality of platform layer components each associated with at least one of the plurality of UI components wherein the data layer components and platform layer components are triggered through the UI components for executing a task and restructuring the application, a dynamic module injector for conditionally loading at least one module on an application UI based on the task wherein the module injector is associated with the platform layer components and the data layer components, a data repository configured for storing a plurality of metadata and data models associated with the UI components, the data layer and the platform layer components, an AI engine coupled to a processor and configured for dynamically generating a set of protocols to execute the task; and an API layer coupled to a controller for triggering the dynamic module injector to conditionally load the at least one module based on the protocols by interacting with the plurality of UI components, the data layer components, the platform layer components and the data repository for restructuring the applications.

In an embodiment, the present invention provides a method for real time restructuring of enterprise and/or supply chain management (SCM) application. The method includes the steps of receiving at least one task from a user through at least one configurable UI component embedded on a micro-front end of the enterprise and SCM application, triggering at least one data layer component and at least one platform layer component each associated with the at least one UI component for executing the task and restructuring the application. The method includes dynamically generating a set of protocols for executing the task by an AI engine based on an AI based processing logic wherein the protocols are generated based on the task, a plurality of metadata and a plurality of data models associated with the UI component; and triggering a dynamic module injector for conditionally loading at least one module on an application UI based on the protocols by interacting with the plurality of UI components, the data layer components, the platform layer components and the data repository for restructuring the application.

In an exemplary embodiment, the present invention provides an application UI as an EA and/or SCM application UI configured for performing EA and/or SCM functions. Further, the invention also provides a micro-front end application UI configured for reconfiguring the EA and/SCM application by dynamically loading modules on the application UI.

In one embodiment, the present invention provides a dynamic module injector for restructuring of enterprise and/or supply chain management (SCM) application. The injector includes at least one module configured for conditionally loading on an application UI, an identifier associated with the at least one module wherein the identifier is triggered based on at least one protocol generated by an AI engine coupled to a processor and based on an AI based processing logic in response to receiving a task from a user; and a data model associated with the identifier and a plurality of metadata stored in a data repository wherein the at least one module interacts with a UI component, a platform layer, a data layer and the data repository based on the task for restructuring the application.

In an embodiment the present invention provides a computer program product for restructuring of enterprise and/or supply chain management (SCM) application of a computing device with memory. The product includes a computer readable storage medium readable by a processor and storing instructions for execution by the processor for performing the above method.

In another embodiment, the present invention provides a user interface (UI) application framework for restructuring of enterprise and supply chain management (SCM) application. The framework includes a configurable user interface (UI) layer for receiving input from a user to accomplish a task, a field layer including a data layer component and a platform layer component wherein the filed layer is triggered through the UI layer for accomplishing the task; a data repository for storing a plurality of metadata and data models associated with a set of protocols generated by an AI engine based on an AI based processing logic to execute the task; a persistence layer configured for identifying dependencies between a plurality of data attributes associated with the application to provide recommendation to the user; and an API configured to interact with the UI layer, the data repository, the persistence layer and the field layer for restructuring the application, wherein the AI based processing logic integrates deep learning, predictive analysis, information extraction and robotics for triggering a dynamic module injector to conditionally load at least one module on an application UI thereby processing the task.

In yet another embodiment, the present invention provides the AI rule engine for restructuring of enterprise and/or supply chain management (SCM) application. The rule engine includes a compiler configured for processing a task received from a user through at least one configurable UI component embedded on a micro-front end of enterprise and SCM application. The engine includes a code module configured for generating a plurality of protocols based on the task, a plurality of metadata and data models associated with the at least one UI component of the application wherein the protocols are generated for executing the task by an AI rule engine based on an AI based processing logic, wherein a controller coupled to the rule engine triggers a dynamic module injector for conditionally loading at least one module on an application UI based on the protocols by interacting with the at least one UI component, the data layer components, the platform layer components and the data repository for restructuring the application.

In an advantageous aspect, the system and method of the present invention optimizes resources by restructuring the application considering the customer demand and supply market conditions in real time without requiring a developer to perform coding for redeveloping the application. The system is further driven by interconnected data across the entire enterprise and supply chain.

In another advantageous aspect, the system of the present invention is not limited to a single set of rules, logic and workflow. The rules, logic, workflow change by industry, geography, commodity etc. to transform the application functions and interface for carrying out the desired operations accurately, faster and with efficient data results.

In yet another advantageous aspect, the system, associated components/elements of the system and method of the present invention reduce effort and enhance efficiency by providing a set of configurable tools, services and components that are restructured through AI processing logic for compatibility with respect to any ERP or SCM operation. Since, any web application development involves considerable effort, the structure of the present system enables boilerplate of a seed that follow the best practices and enforce standards as it is a vital process to cut cost and boost productivity. Further, the invention provides enterprise seed structure, core, shared and features modules; centralize metadata, configurations, settings, data models and logging management. The invention maintains and tracks application state and produce a series of changes applied to configuration and data. Also, the system employs unified generic UI components gallery to drastically reduce tasks using AI processing logic.

The invention provides a system that is not dependent on single set of machine learning or AI algorithms or protocols or certain data sets. These algorithms or data sets or protocols change, evolve over time and the system is configured to use these algorithms and data sets and thus continue to improve its restructuring capability.

BRIEF DESCRIPTION OF THE DRAWINGS

The disclosure will be better understood and when consideration is given to the drawings and the detailed description which follows. Such description makes reference to the annexed drawings wherein:

FIG. 2 is a flowchart depicting a method for restructuring an enterprise or supply chain management application in accordance with an embodiment of the invention.

DETAILED DESCRIPTION

Figure 1:
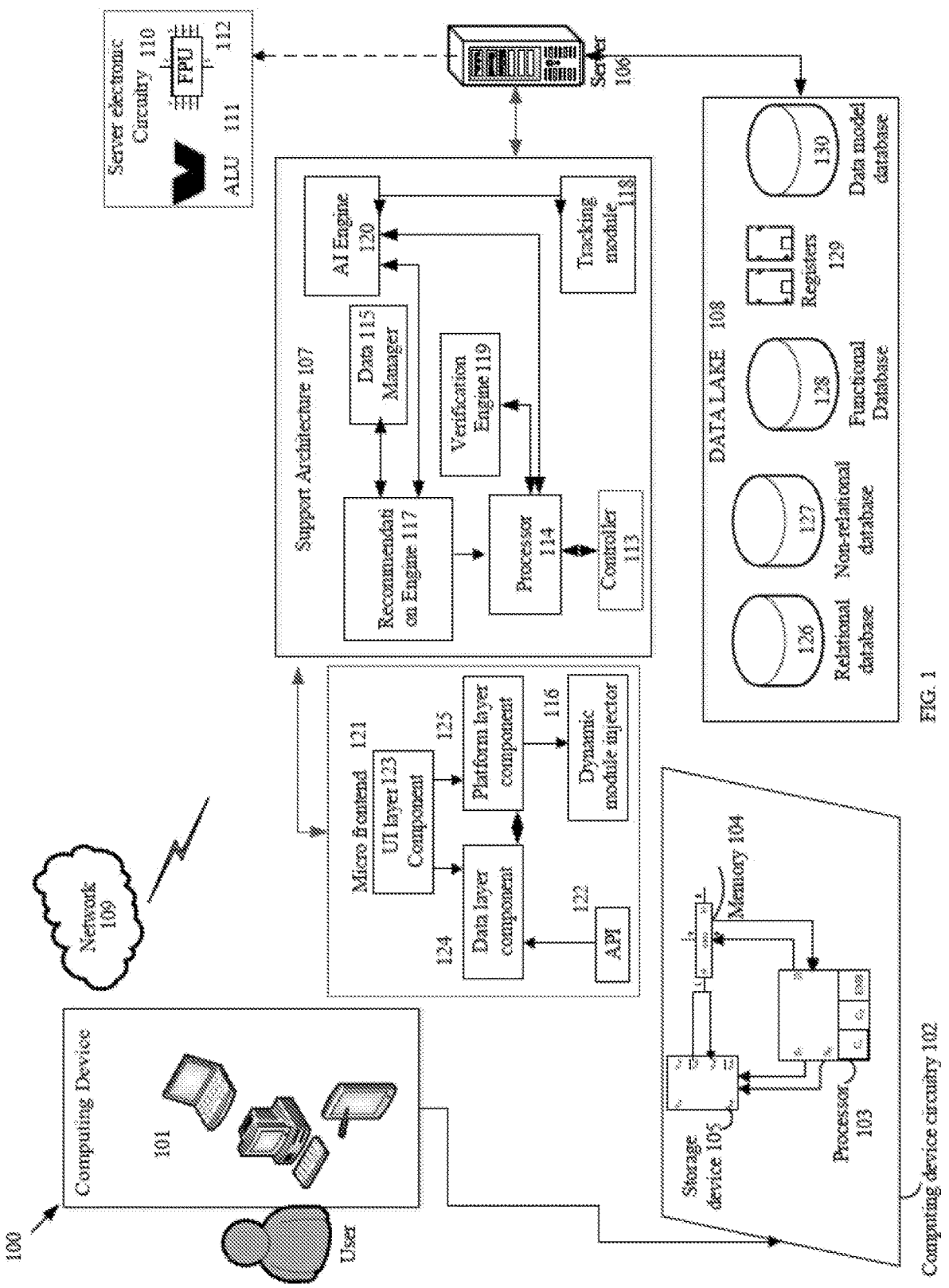
FIG. 1 is a view of system for restructuring of an enterprise or supply chain management application in accordance with an embodiment of the invention.

Described herein are nonlimiting example embodiments of the present invention, which includes Artificial Intelligence, machine learning based enterprise and supply chain management systems and methods for restructuring the same.

The various embodiments including the example embodiments will now be described more fully with reference to the accompanying drawings, in which the various embodiments of the invention are shown. The invention may, however, be embodied in different forms and should not be construed as limited to the embodiments set forth herein. Rather, these embodiments are provided so that this disclosure will be thorough and complete, and will fully convey the scope of the invention to those skilled in the art. In the drawings, the sizes of components may be exaggerated for clarity.

It will be understood that when an element or layer is referred to as being "on," "connected to," or "coupled to" another element or layer, it can be directly on, connected to, or coupled to the other element or layer or intervening elements or layers that may be present. As used herein, the term "and/or" includes any and all combinations of one or more of the associated listed items.

Spatially relative terms, such as "protocols," "rules," or "scripts," and the like, may be used herein for ease of description to describe one element or feature's relationship to another element(s) or feature(s) as illustrated in the figures. It will be understood that the spatially relative terms are intended to encompass different orientations of the structure in use or operation in addition to the orientation depicted in the figures.

The subject matter of various embodiments, as disclosed herein, is described with specificity to meet statutory requirements. However, the description itself is not intended to limit the scope of this patent. Rather, the inventors have contemplated that the claimed subject matter might also be embodied in other ways, to include different features or combinations of features similar to the ones described in this document, in conjunction with other technologies. Generally, the various embodiments including the example embodiments relate to enterprise and supply chain management system and methods of restructuring the same.

Referring to FIG. 1, a system 100 for restructuring an enterprise and/or supply chain management application is provided in accordance with an embodiment of the present invention. The system 100 includes at least one computing device/entity machine 101 for initiating at least one task to be performed for restructuring the applications over a network. The system 100 further includes an application server 106 configured to receive input from the entity machine 101. The system 100 includes a micro-frontend support architecture 107 for performing the task to restructure the applications depending upon the type of input received at the server 106. The system 100 includes a datastore/data lake 108 for storing plurality of data from distinct configurable sources, where the data includes, text data, voice data, image data, functional data, data models, scripts etc. to be processed based on Artificial intelligence and machine learning. The system 100 connecting various elements through a network 109. The network 109 enables formation of sub networks depending on the requirement of the function to be performed on the application.

The system includes a plurality of configurable UI components as part of a UI layer 123 embedded on a micro-front end 121 of the enterprise and SCM application. The system also includes a plurality of data layer components 124, a plurality of platform layer components 125, a dynamic module injector, the data store/data lake/data repository 108, an AI engine, and an API layer 122 coupled to a controller 113 for triggering the dynamic module injector 116 to conditionally load at least one module of the injector based on the protocols by interacting with the plurality of UI components 123, the data layer components 124, the platform layer components 125 and the data repository 108 for restructuring the applications.

In an embodiment, the AI engine 120 is a rule creator engine that generates protocols based on the task. The rule creator engine 120 is an easy and intuitive graphical tool that enables the user to create and modify validation and workflow rules for the application and define custom rules in real time as per transformational requirements.

In an embodiment, the protocols are backend scripts created by a bot based on the task, the plurality of metadata, data models and AI processing for enabling execution of the task thereby restructuring the application.

In an embodiment, the AI engine 120 generates the protocols based on AI based processing logic that integrates deep learning, predictive analysis, information extraction, planning and robotics for triggering the dynamic module injector 116 to conditionally load at least one module on an application UI thereby processing the task.

In an embodiment, the enterprise applications include finance applications like automated billing applications and payment processing applications, Customer relationship management applications (CRM) and enterprise resource planning applications (ERP).

In an embodiment, the EA and SCM applications include a plurality of nodes like inventory, logistics, warehouse, procurement, customers, supplier, retailers, distributors, resellers, co-packers and transportation wherein the nodes interact with each other to restructure a plurality of functions associated with the applications.

In an embodiment, the entity machine 101 may communicate with the server 106 wirelessly through communication interface, which may include digital signal processing circuitry. Also, the entity machine 101 may be implemented in a number of different forms, for example, as a smartphone, computer, personal digital assistant, or other similar devices. The entity machine 101 includes internal circuitry 102 that may include processor 103, memory 104 and storage device 105.

In an embodiment the server 106 of the invention may include various sub-servers for communicating and processing data across the network. The sub-servers include, but are not limited to, content management server, application server, directory server, database server, mobile information server, micro-frontend component support server and real-time communication server.

In an example embodiment, the server 106 may include electronic circuitry 110 for enabling execution of various steps by a processor of the server 106. The electronic circuitry 110 has various elements including but not limited to a plurality of arithmetic logic units (ALU) 111 and floating-point Units (FPU) 112. The ALU 111 enables processing of binary integers to assist in addition or modification of application UI components by formation of a tables of variables where a protocol or operational script created based on data models is applied to data sets impacting multiple functions like demand planning, supply planning, forecasting, budgeting etc. in applications like ERP or supply chain management (SCM). In an example embodiment, the server electronic circuitry 110 as shown in FIG. 1, may additionally include other processors, memory, storage devices, high-speed interfaces connected through buses for connecting to memory and high-speed expansion ports, and a low speed interface connecting to low speed bus and storage device. Each of the components of the electronic circuitry 110 are interconnected using various busses and may be mounted on a common motherboard or in other manners as appropriate. The processor 114 can process instructions for execution within the server 106, including instructions stored in the elements of the data store/data lake 108 like memory or on the storage devices to display graphical information for a GUI on an external input/output device, such as display coupled to a high-speed interface. In other implementations, multiple processors and/or multiple busses may be used, as appropriate, along with multiple memories and types of memory. Also, multiple servers may be connected, with each server providing portions of the necessary operations (e.g., as a server bank, a group of blade servers, or a multi-processor system).

In an exemplary embodiment the present invention includes a Micro front end 121 interacting with the entity system 101, the server 106 and the support architecture 107. The Micro frontend improves user experience and performance by breaking-down the interface features into a list of modules, configure routing to bundle each module separately and chunking the initially loaded files, which is helping to rendering the application faster. Further the loaded modules are Cache locally, which improves the performance by loading the module from the local machine next time. The Micro front end 121 includes API 122, UI layer component 123, Data layer component 124 and platform layer components 125.

Figure 1A:
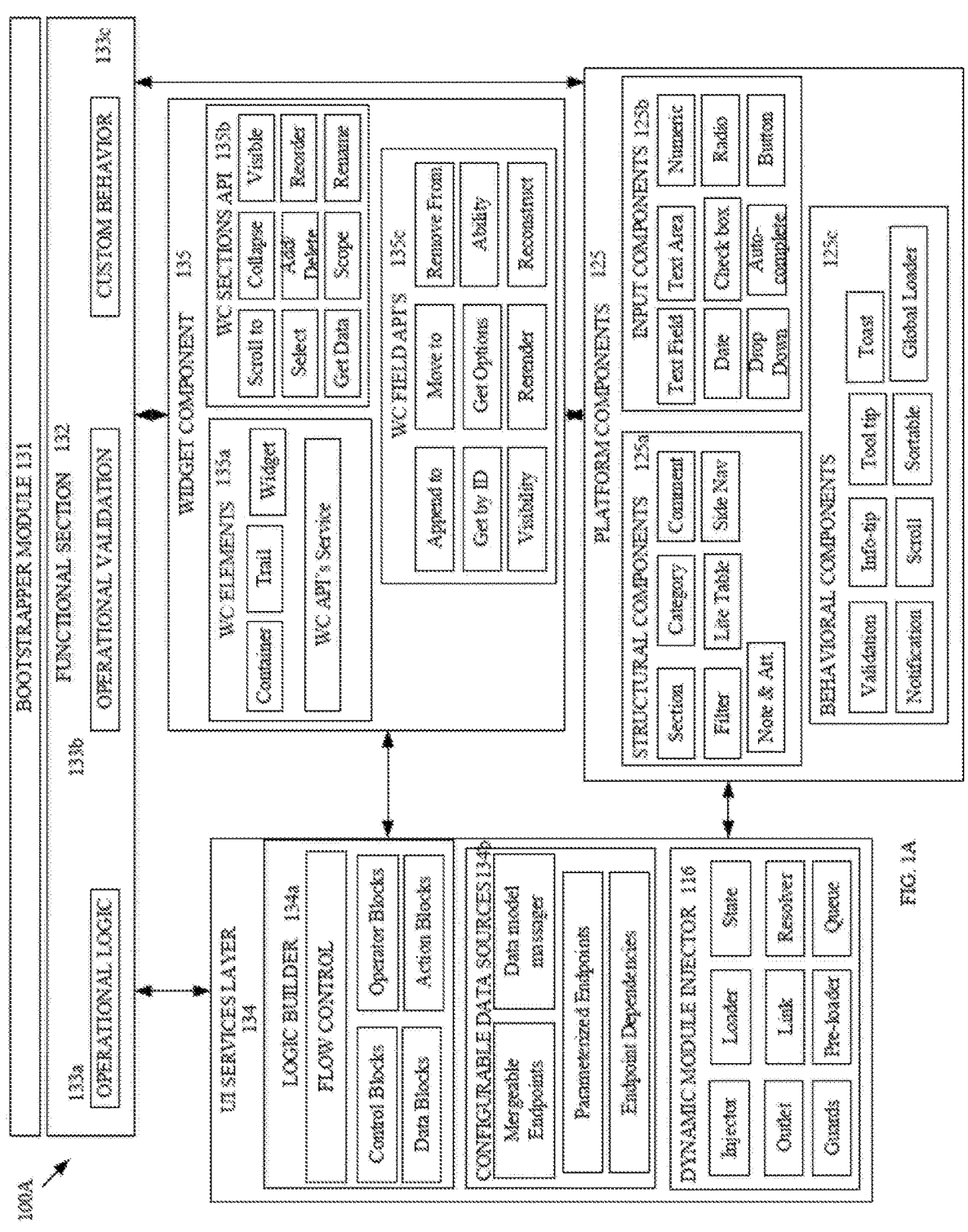
FIG. 1A is a Micro frontend architecture of the system for restructuring enterprise or supply chain management application in accordance with an embodiment of the invention.

In one example embodiment, referring to FIG. 1A, a micro-frontend architecture 100A of a system configured to restructure enterprise and supply chain management application is provided. The architecture 100A includes, bootstrapper module 131 on top of a functional section 132 with operational logic 133a, operational validation 133b and custom behavior 133c. The functional section 132 is communicating with a platform services tool 134, widget component tool 135 and platform components tool 125 where these tools interact with one another as well.

In a related embodiment, the platform components 125 includes structural components 125a, input components 125b and behavioral components 125c. The structural components 125a may include section, filter, category, lite table, comment, side Nav, note and attribute among others. Further, the input components 125b may include text field, date, drop-down, text area, check box, auto-complete, numeric, radio and button among others. Similarly, the behavioral component 125c may include validation, notification, toast, info-tip, scroll, global loader, tool tip and sorter among others.

In another related embodiment, the widget component (WC) tool component 135 includes WC elements 135a, WC sections API's 135b and WC field API's 135c. The WC elements 135a include container, trail, widget interacting with WC API services. WC sections API 135b may include scroll to, select, get data, collapse, Add/delete, scope, visible, reorder and rename components among others. The WC field API 135c may include append to, Get by ID, visibility, move to, get options, re-render, remove from, ability and reconstruct among others.

In an embodiment, the widget component is configured for enabling the user to implement logics through a scope module of the widget. The scope module is related to a user work profile, activity and the task related to restructuring of the application. The processor 114 of the system is coupled with the widget component and configured to generate new forms using a set of default base documents and leverage an existing master data element exposed through the API 122.

In another related embodiment, the platform services component 134 includes logic builder 134a, configurable data source 134b and dynamic module injector components 116. The logic builder component 134a includes flow control component interacting with control blocks, data blocks, operator blocks and action blocks for building the logic to carry out the task.

In a related embodiment, the configurable data sources 134b include mergeable endpoints, parameterized endpoints, endpoint dependencies and a data model massager. The data source such as inventory, purchase order, invoices, finance modules, contracts, RFx modules, supplier module, item master, supplier master, bill of materials, vendor master, warehouse management module and logistics management module are configurable for restructuring the application.

In an embodiment, the dynamic module injector component 116 includes injector, outlet, guards, loader, link, preloader, state, resolver and queue blocks as part of the micro-frontend architecture.

In an exemplary embodiment, the dynamic module injector 116 includes at least one module configured for conditionally loading on an application UI, an identifier associated with the at least one module and a data model associated with the identifier and a plurality of metadata stored in the data repository 108 wherein the at least one module interacts with the UI component 123, the platform layer 125, the data layer 124 and the data repository 108 based on the task for restructuring the application. The identifier is triggered based on at least one protocol generated by the AI engine 120 coupled to the processor 114 and based on an AI based processing logic in response to receiving a task from a user. The at least one module relates to functions of the application including procurement, inventory management, supplier management, warehousing, transporting, Purchase order and logistic. Further, the identifier is an element of the injector 116 associated to a code of the protocol and configured for uniquely identifying the module to be triggered by the AI engine 120. Furthermore, the data model is a conceptual, logical and physical structure relating data objects associated with the identifier and the plurality of meta data.

In an example embodiment, the support architecture 107 of the system 100 includes the controller 113 encoded with instructions enabling the controller 113 to function as a bot for triggering a dynamic module injector to conditionally load the at least one module based on the protocols by interacting with the plurality of UT components 123, the data layer components 124, the platform layer components 125 and the data repository 108. The controller 113 selects an Artificial Intelligence based dynamic processing logic using the bot to reduce the processing time for performing functions of the ERP or SCM applications. The processing logic for each function of an application is different. The controller 113 is configured to determine and generate a processing logic for each function in real-time depending on the task, and processing cycle of that task based on received data form the entity to restructure the application. For eg., the processing logic may include serial or parallel processing of certain SCM functions depending on the impact of execution of the task on one or more UI components 123 to restructure the applications. The system also includes a processor 114 configured to process various functions based on the AI based processing of tasks, data sets and data models by the bot. The support architecture 107 includes a data manager 115 for managing data relating to any task for restructuring Enterprise application EA or SCM application.

In an example embodiment, a user administrator can configure and attach new attributes from SMART field repository to display inventory in hand and in transit from inventory management & pending Purchase orders. In case of changed attributes like supplier lead time during inventory or transportation function of a SCM, the application is restructured by adding field component as UI component on the application interface as an additional parameter for assessment. The rules will be applied to filter data based on the product (Line Item) & Supplier associated with product. Based on historical POs & Receipts returns, the AI engine of the support architecture determines relevant data models from the repository for executing the processing of historical information to compute lead time based on supplier, product, ship to location and probability of goods returned to due to quality issues will be available for the admin. Field will be part of field repository, calculated in real-time. Further, at the time of creating new purchase order, additional information will help user to send additional information to supplier as well as the requester. For users creating Purchase Order, new attributes & widgets can be configured on Purchase order interface to display real-time status to be considered for carrying out any enterprise or SCM function. The impact of addition or modification of the UI component of various function of the SCM application is analyzed to restructure the application accordingly.

Figure 1B:
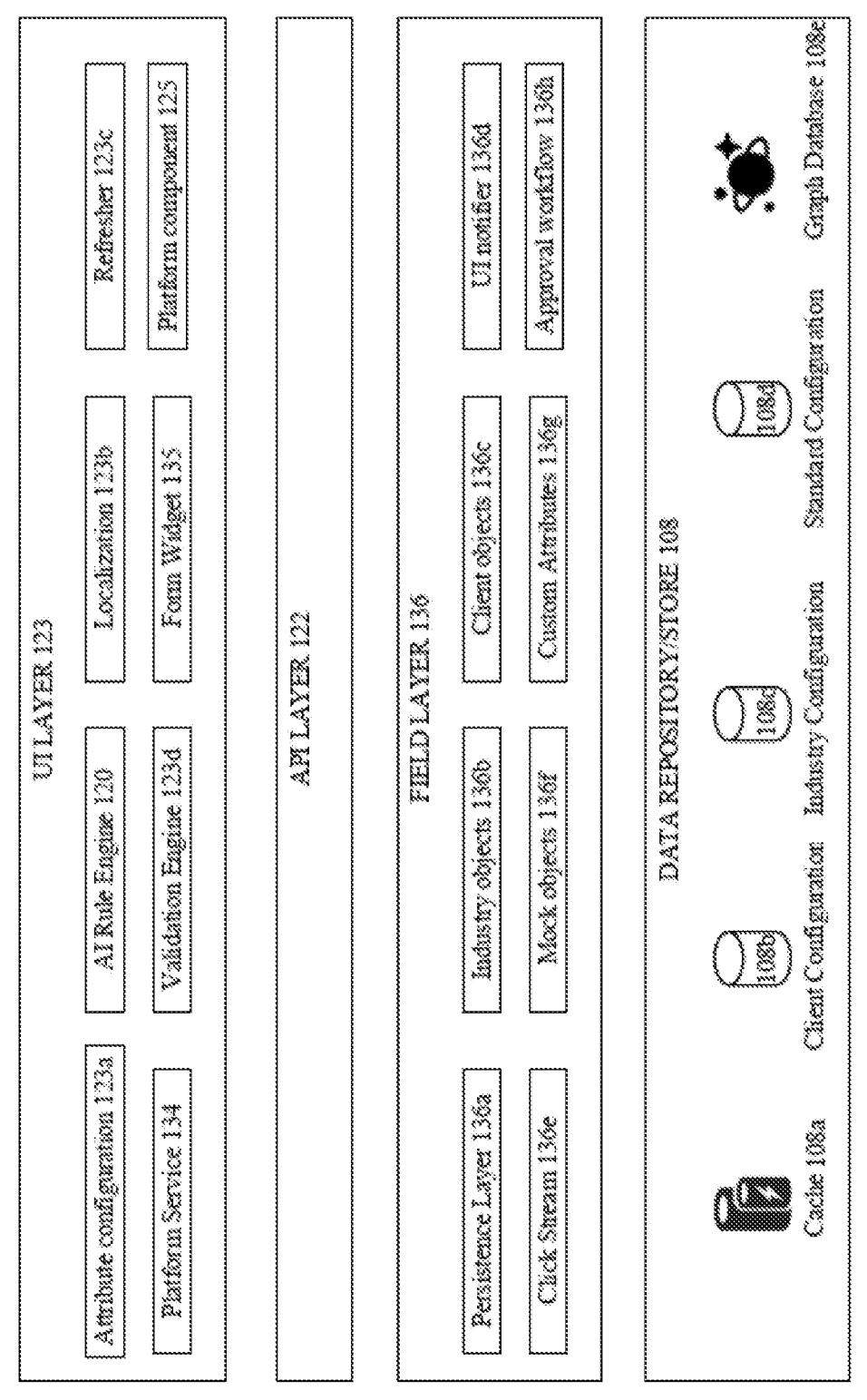
FIG. 1B is a Layer diagram of the system for restructuring enterprise or supply chain management application in accordance with an embodiment of the invention.

In an example embodiment, referring to FIG. 1B, a layered architecture 100B of the system of the present invention is shown. The layered architecture includes UI layer 121, API layer 122, Field layer 136 and data repository/store 108. The UI layer 1232 includes AI engine/rule engine 120, attribute configuration 123a, localization 123b, refresher 123c, platform service 134, validation engine 123d, Widget component 135 and platform component 125. The Field layer 136 includes a persistence layer 136a, industry objects 136b, client objects 136c, UI notifier 136d, click stream 136e, mock objects 136f, custom attributes 136g, and approval workflow 136h. The data repository 108 further includes a cache memory 108a, client configuration data 108b, industry configuration data 108c, standard configuration data 108d and graph database 108e.

In an embodiment the system the persistence layer 136a is configured to identify dependencies between a plurality of data attributes associated with the task for providing recommendations by a recommendation engine 117 to user during a follow up task as the layer 136a captures and retains logs for UI components selected by the user for creating any document e.g. Order, Contract etc.

In another embodiment the plurality of mock objects 136b inserted to execute an ERP or SCM operation scenario wherein the mock objects are configured to test functionalities associated with the operation scenarios.

Figure 1C:
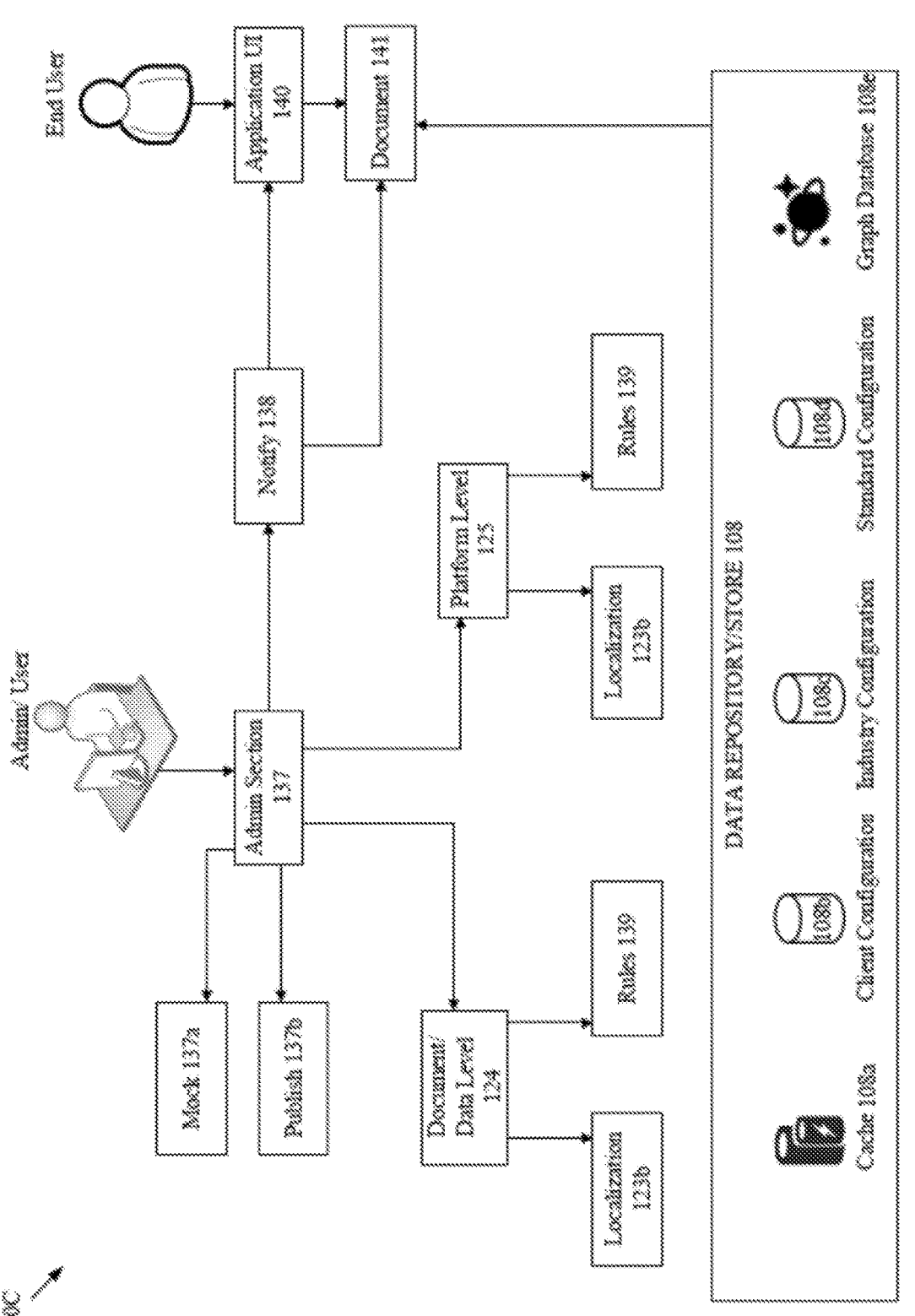
FIG. 1C is a block diagram of the system configured to restructure EA or SCM application with Admin user and End user in accordance with an embodiment of the invention.

In an exemplary embodiment, the block diagram for the system configured to restructure EA and SCM application with Admin user and End user is shown in FIG. 1C. The system block diagram 100C includes an admin user section 137 where the admin as a user incorporates restructuring of the application as per the organization requirement, without being a developer. The admin user further interacts with document/data level 124 and platform level components 125. The admin user enables restructuring of the application by working with mock 137a level for testing and publish 137b the operation results. Further, the data level component 124 and platform level component includes localization 123b and rules 139 for executing the restructuring of the application. The admin section 137 sends notification to end user through restructured application UI 140 and the end user received documents through the data repository 108 for executing various EA and SCM operations. The application UI is the EA or SCM application UI 140 that is restructured in real time by the Admin User working on a UI application framework of the present invention that enables modification of the SCM application itself. The SCM application UI is used by the End User for carrying out EA and SCM operations.

The processor 114 may be implemented as a chipset of chips that include separate and multiple analog and digital processors. The processor 114 may provide coordination of the other components, such as controlling user interfaces, applications run by devices, and wireless communication by devices.

The Processor 114 may communicate with a user through control interface and display interface coupled to a display. The display may be, for example, a TFT LCD (Thin-Film-Transistor Liquid Crystal Display) or an OLED (Organic Light Emitting Diode) display, or other appropriate display technology. The display interface may comprise appropriate circuitry for driving the display to present graphical and other information to an entity/user. The control interface may receive commands from a user and convert them for submission to the processor 114. In addition, an external interface may be provided in communication with processor 114, so as to enable near area communication of device with other devices. External interface may provide, for example, for wired communication in some implementations, or for wireless communication in other implementations, and multiple interfaces may also be used.

In an embodiment, the support architecture is configured to analyze and enable absorption of any new data received at the data lake in real time using natural language processing and machine learning algorithms for dynamic restructuring of the application with enhanced accuracy. Since, the data will be received from multiple disconnected sources, the support architecture has an ability to remove standardize, group and absorb the data to be used across various functions.

In an example embodiment, the data lake 108 includes plurality of databases as shown in FIG. 1. The data lake 108 includes a relational database 126 for storing related data sets received from configurable data sources, a non-relational database 128 for storing non-related raw data sets, a functional database 128 for storing a library of functions enabling creation of a plurality of data models for execution of tasks to restructure the applications including ERP and SCM, a plurality of registers 129 for temporarily storing data from various sources for determination of characteristic of the task like change in UI component or receipt of addition of a new UI component itself. The received task may be related to any function of the application. The data lake 108 further includes a data model database 130 for storing plurality of data models, where the data models enables dynamic generation of protocols based on a predicted impact of modification or addition of a new UI component on the functions of the applications.

The data lake 108 may be supported by different memory like a volatile memory, a non-volatile memory or memory that may also be another form of computer-readable medium, such as a magnetic or optical disk. The memory may also include one or more storage devices capable of providing mass storage. In one implementation, at least one of the storage devices may be or contain a computer-readable medium, such as a floppy disk device, a hard disk device, an optical disk device, a tape device, a flash memory or other similar solid-state memory device, or an array of devices, including devices in a storage area network or other configurations.

Referring to FIG. 1, the various elements like the support architecture 107 and the memory data lake 108 are shown as external connections to the server 106 in accordance with an embodiment of the invention. However, it shall be apparent to a person skilled in the art that these elements may be part of an integrated server system. Also, some of the sub-elements of the support architecture 107 and the data lake 107 either alone or in various combinations may be part of a server system as other external connections.

In an example embodiment, the Data Lake 108 includes data received from nodes or sources such as customers or retailers, distributors, factories, productions, suppliers etc. It also includes data from outside sources such as financial markets, weather, social media, geo-economics etc. On this Data Lake 108 the executional platform is built that includes functions or products such as planning, Production, Procurement, Suppliers etc. This enables the system to build a real time machine learning or AI based recommendations that guide the user to incorporate additional elements or UI components relating to functions of the applications thereby enabling the user to conduct his or her work on daily basis with more accurate data, with higher confidence and from a system that is easier to use, restructure and intelligent to accept dynamic undefined field parameters.

In an embodiment, the system of the present invention includes means to add incremental data fields depending on the changes in the functions and associated evaluation parameters as the system evolves.

In an embodiment, the plurality of functions of the application may include demand planning, supply planning, production planning, forecasting, smart factory and fulfillment planning among others. It shall be apparent to a person skilled in the art that the EA and SCM applications may include other functions within the scope of the present invention.

In an exemplary embodiment, the system of the present invention includes interconnected data across the plurality of functions connecting demand with supply by combining customer and supplier data in real time and thereby enabling the user to restructure the application for incorporating data in real-time from multiple sources including supplier, customer, factories and warehouses. Since data related to each function is stored and managed through a common data store/repository, the data is interconnected across functions through the common platform. Demand and supply is connected through the restructured application with minimum and desired UI components fields as parameters to be assessed for executing the function as per the user needs. The impact of change in data is assessed for individual functions using analysis of the same received data in the system. Also, the relation and utilization of all UI components across functions of the applications is assessed to connect demand and supply in efficient and time saving process.

In an embodiment, the impact of additional or modified UI component on the application is determined by the data models wherein the data models are auto-selected based on the change. Consider, transportation in SCM, if a supplier address needs to be added as a new UI component, then it would impact multiple applications and functions. For eg., if address of supplier changes, the lead time would change based on distance of the supplier from the delivery point, the pricing of the service would change which in turn would impact functions like PO etc. Accordingly, the UI component shall be incorporated in other functional interface of the application like the Purchase order screen. This additional field or UI component would intercept impact on multiple functions across the applications at different scale. The impact determined by the data models provides a common reference for assessing the impact of the change in address thereby enabling the bot to restructure the application functions in reduced time frame for faster processing.

In an embodiment, the system is provided in a cloud or cloud-based computing environment.

In an embodiment the system 100 includes a test module configured to test the plurality of data models and apply the tested data models to the applications in real time. Further, real time data is fed into the data model and results are compared in real time to determine accuracy and efficiency of the data models. The system 100 is configured for switching data models for different applications based on the application functions and efficiency of the tested data models for those functions. The switching occurs in real time and is an extremely complex process carried out using AI based analysis of a performance of the data models, the received task, and an impact of the tasks on the functions related to enterprise and SCM applications.

In an example embodiment of the invention, the system 100 provides a sub network including the at least one server 106 in communication with a plurality of distinct data sources. Further, the sub network includes communication between various network components like sub-servers, devices associated with multiple ERP and SCM applications, for executing identified functions. The sub network enables interlinking of added or modified UI components of the application and associated data to different functions for performing an integrated operation and simultaneously also enables performance of identified single function by utilizing essential steps from the other network components of the sub-network.

In an embodiment the ERP and SCM applications include supplier management operations, procurement operations, inventory management operations, account payable operations etc. An example of the present invention organizes the supply chain between manufacturers and service providers. In an example of the present invention, the SCM operations include elements that enable management of end-to-end supply chain information such as demand planning, order fulfillment, scheduling, inventory, etc.

In an embodiment, the demand and supply of manufacturer offerings are planned utilizing the sub network in operation and orders for the manufacturer offerings are also managed utilizing the sub network with server and other network devices in communication with each other for data capturing, application restructuring and data exchange. The sub network is also utilized to manage sub network assets including providing maintenance and service for the sub network assets utilizing the sub network.

In one of the advantageous aspects of the present invention, the applications provide revenue enhancement, cost reduction and capital reduction by efficient utilization of resources with reduced timelines due to real-time restructuring of application by generating dynamically a set of protocols based on data models/machine learning models impacting multiple functions across ERP and SCM.

In an embodiment, the inventory management function of the SCM application at a warehousing includes scanning of a set of received goods by a tracking module/IOT device 118 and transmitting the specific warehousing data of the scanned goods to the at least one server for storing in the data lake. Such data is added as a UI component on PO application interface for consideration at the time of ordering by a user. The user may add this field for PO application function and any change in the data related to received goods is analyzed and reflected across UI of other SCM functions on the application using data models and dynamically created scripts. Such, real time restructuring of application enables faster processing of updated information enabling accurate decision making at the time of ordering. Since, the user can add or modify or create new UI component without the developer, the changes carried out on the interface for one function shall reflect on other application function interface thereby creating a sub-network or related information exchange that enables faster processing of functions in a restructured enterprise and SCM application.

In example embodiments, the bot is a software bot or a combination of a software and hardware bot. In an embodiment, the software bot is a computer program enabling a processor to perform remodeling or recalibration of functions by utilizing AI based on addition or modification of UI components to restructure the application depending on the task.

In another embodiment, the bot as a combination of hardware and software, where the hardware includes memory, processor, controller and other associated chipsets especially dedicated to perform restructuring of the application by including parameters/fields impacting ERP and SCM functions to be carried out by the applications.

In an embodiment, the at least one server includes a front end web server communicatively coupled to at least one NoSQL data repository wherein the front end web server is configured for reprocess an attribute configuration and localization operation/functions to inject at least one module based on the protocols by receiving the module processed by the NoSQL database server and applying the AI based dynamic processing logic to the operation to restructure the application using the bot. The AI based processing logic includes a sequential, a parallel or a switching-based processing logic or a combination thereof.

Referring to FIG. 2 a flowchart 200 depicting a method for restructuring enterprise and supply chain management (SCM) applications is shown. The method comprises the steps of S201 receiving an input task from a user through at least one configurable UI component embedded on a micro-front end of the enterprise and SCM application. In S202 triggering at least one data layer component associated with the at least one UI component for executing the task and restructuring the application. In S203 triggering at least one platform layer component associated with the at least one UI component for executing the task and restructuring the application. In S204 dynamically generating a set of protocols for executing the task by an AI engine based on an AI based processing logic wherein the protocols are generated based on the input task, a plurality of metadata and a plurality of data models associated with the UI component. In S205, triggering a dynamic module injector for conditionally loading at least one module on an application UI based on the protocols by interacting with the plurality of UI components, the data layer components, the platform layer components and the data repository for restructuring the application.

In one embodiment, the task includes addition of a functional UI component on the UI application wherein the functional UI component is a dynamic component created by the user based on any additional functionality or parameter to be considered for running the application.

In another embodiment, the task includes embedding templates for restructuring the application where the templates are related to sourcing, procurement or supply chain functions.

In yet another embodiment, the task includes modification of an existing UI component on the UI application for accommodating transformations required based on new or modified operational requirement for the application. The operational requirement could be related to any of the ERP or SCM application operations such as inventory management, requisition, approvals, purchase order etc.

In a related embodiment, the task includes configuring labels in multi languages of form elements and publish the labels on UI application to start leveraging operational forms like Purchase Order, Contract and Inventory. Further, the data component layer and platform component layer enable the user to change the labels and add additional strings to support localization.

The localizations as an app specific resource are decoupled from application implementation, accordingly it enables changing a field key or introduce a new language without the need to change the application codebase. Localization details are stored in hierarchy and relationship format which makes it easier to retrieve data in a single query. Further, since localization is centralized and not part of application codebase, it is easier to manage it in central repository. Admin User can define and manage localization resources for a given application for a specific entity and produce the localization collection to be dispatched to the entity's hosting.

Core Packages are designed to allow highly customizable user experience. Authorized users can edit a field, section and nearly any UI element label and save it as a draft or submit for approval. Once the request for change is approved (could be auto-approved), localization collection will be produced and dispatched to end-user terminal.

The system of the present invention empowers admin Users to define and manage the configuration thereby reducing onboarding time for new entities in an EA or SCM application platform. Configuration is easier, entity can customize the application localization to fit its needs without any delays. System Admin can update the language and behavior of UI elements for that specific app or based on the element system will prompt user to update the labels across all apps e.g. operational terminology and process flow for service organization will be different than oil gas organizations. Behavior change in the elements using rule engine triggers workflow and update information across EA or SCM application. The AI enabled Rule engine recommends users about the required validation as per industry implementation. In case same fields are used in the same widgets, rule engine will prompt user on duplicate labels.

Figure 3:
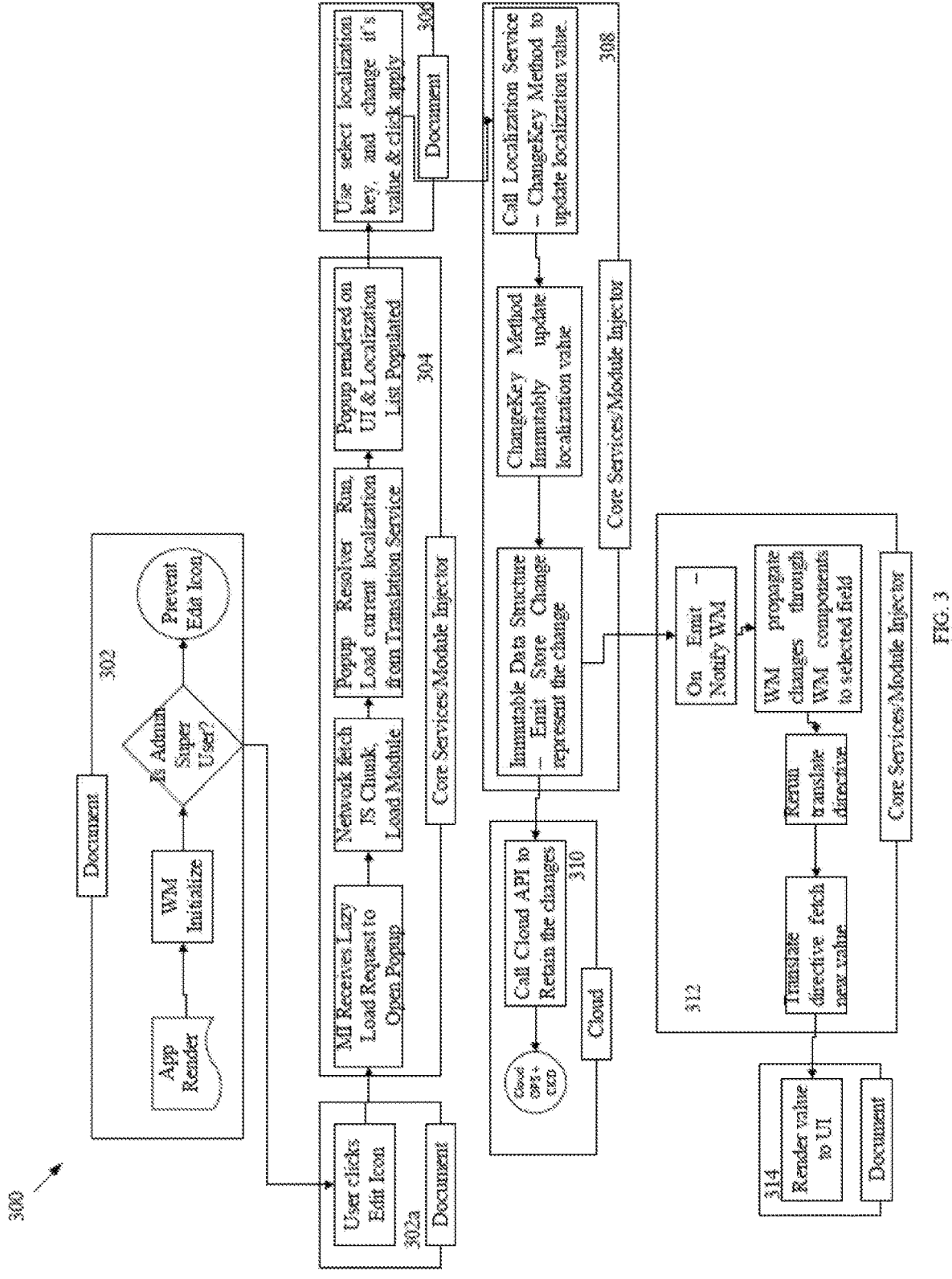
FIG. 3 is a flow diagram depicting process flow of changing UI attributes and behavior of field attributes in accordance with an embodiment of the invention.

FIG. 3 is a flow diagram 300 depicting process flow of changing UI attributes and behavior of field attributes in accordance with an embodiment of the invention. The process flow includes determination of user's permission by the widget manger and injecting edit localization if authorized by the user in 302. In 302a, when user initiates edit, in 304 the dynamic module injector loads localization popup and renders it to screen. In 306, user/admin searches and identifies localization keys to be updated. In 308, user/admin applies to retain the localization changes. In 310, localization service submits the changes in 308 to cloud to produce new localization binary. In 312, localization service emits a notification change to widget manager to propagate the changes to a child UI element. In 314, localization directive fetches the changed values and update the application UI/dynamic object module (DOM) elements.

In related embodiment, the present invention provides a multilingual interface as a key feature in the application. The localizations are Centralized Localization as an application specific resource that are decoupled from application implementation, accordingly it's easy to change a field key or introduce a new language without the need to change the application codebase.

In an exemplary embodiment the present invention provides an administration Portal separate from an end user interface. Since localization is centralized and it's not part of app codebase, it's easier to manage them in one place. Admins can define and manage localization resources for a given app(s) for a specific client and produce the localization collection to be dispatched to client's hosting. Further, the invention provides end User Customization where Core Packages are designed to allow highly customizable user experience. Authorized users can edit a field, section and nearly any UI element label and save it as a draft or submit for approval. Once the request for change is approved (could be auto-approved), localization collection will be produced and dispatched to end-user terminal.

In an exemplary embodiment, onboarding new users to the application becomes easier, since industrial terminology is no longer an issue. Users can customize the application(s) localization to fit their needs without any delays.

Figure 4:
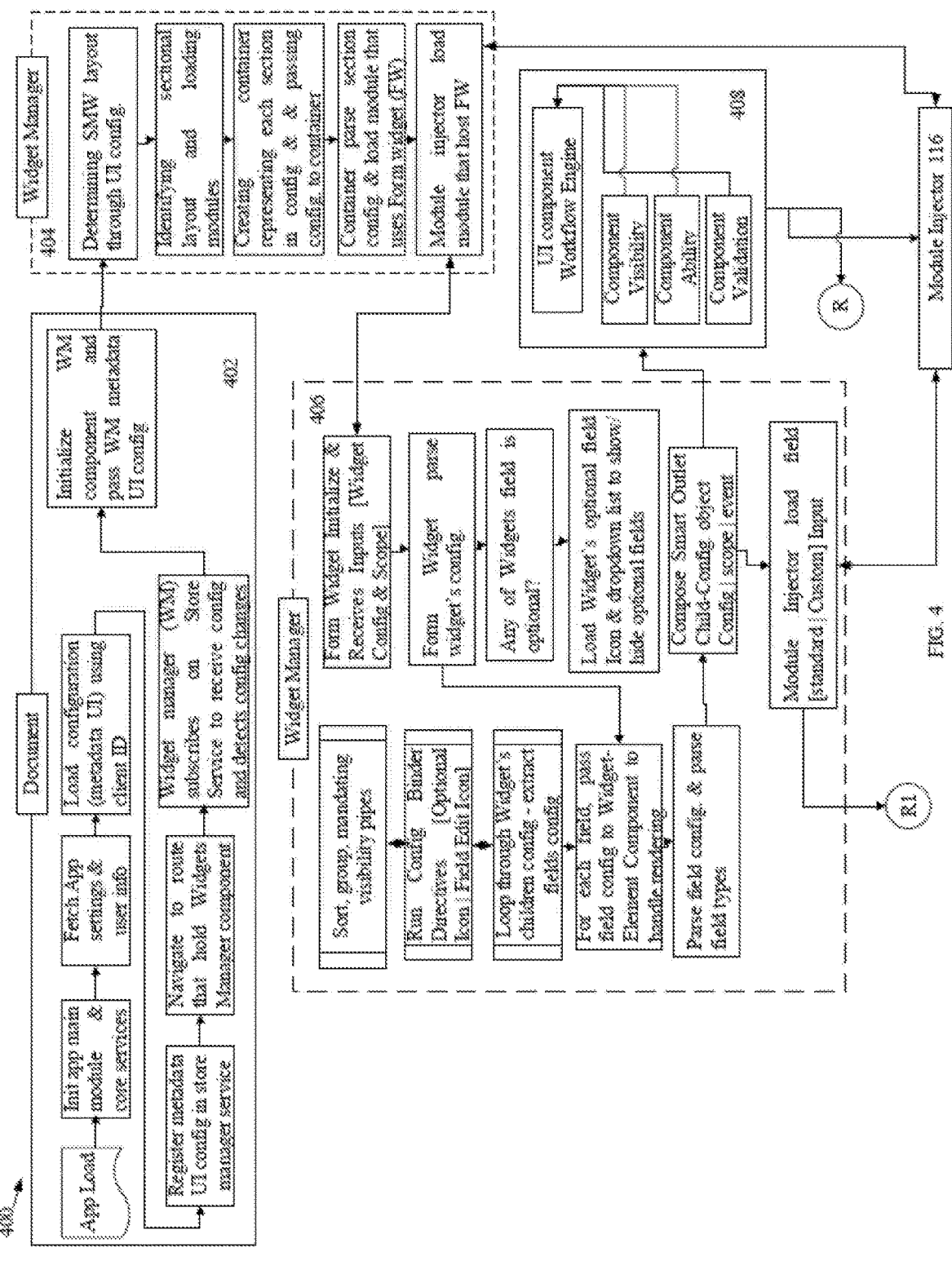
FIG. 4 is a flow diagram depicting a process flow in widget component with Widget manager in accordance with an embodiment of the invention.
Figure 4A:
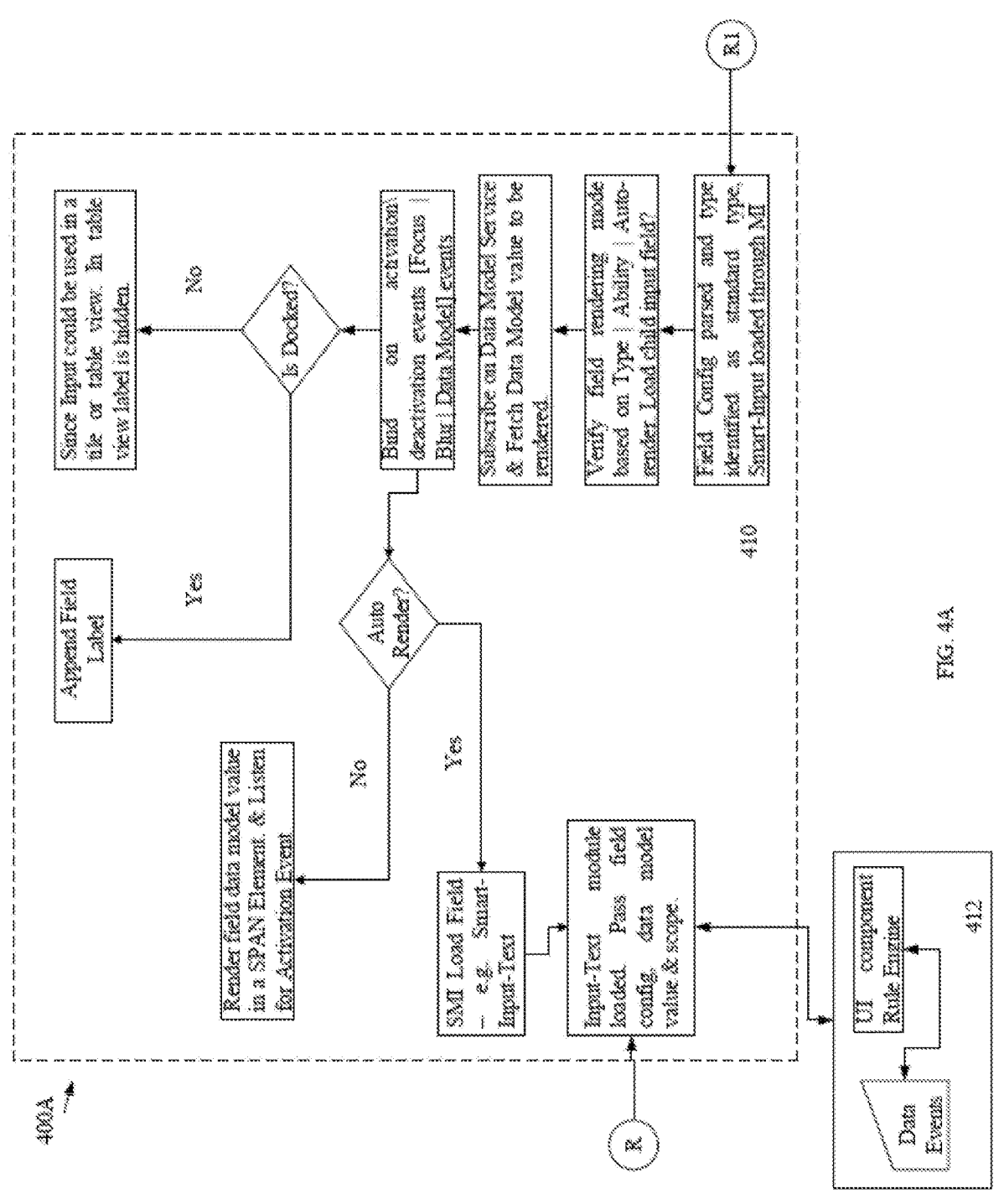
FIG. 4A is a flow diagram depicting processing of input to generate module for UI component by module injector to restructure EA and SCM applications in accordance with an embodiment of the invention.

FIGS. 4 and 4A are flow diagrams 400, 400A depicting a process flow in widget component with Widget manager in accordance with an embodiment of the invention. The process flow includes document to host Widgets Manager in a routable module and pass client config in 402. In 404, Widgets Manager identify the widget's module and request Module injector 116 to load it. In 406, Module injector Outlet injects the widget's module into the application UI and pass widget's config and scope. In 408, Widget request Workflow engine to determine UI Element visibility. In 410, (FIG. 4A) Workflow Engine determines that UI Element is visible and requests Module injector to load input field. The Module injector Outlet inject the Input module into the application UI and pass input config and scope. The workflow Engine determine the field ability and enable\disable field accordingly. In 412, Rules Engine is triggered when field loaded or edited to determine field validity and reflects field validity state.

Figure 5:
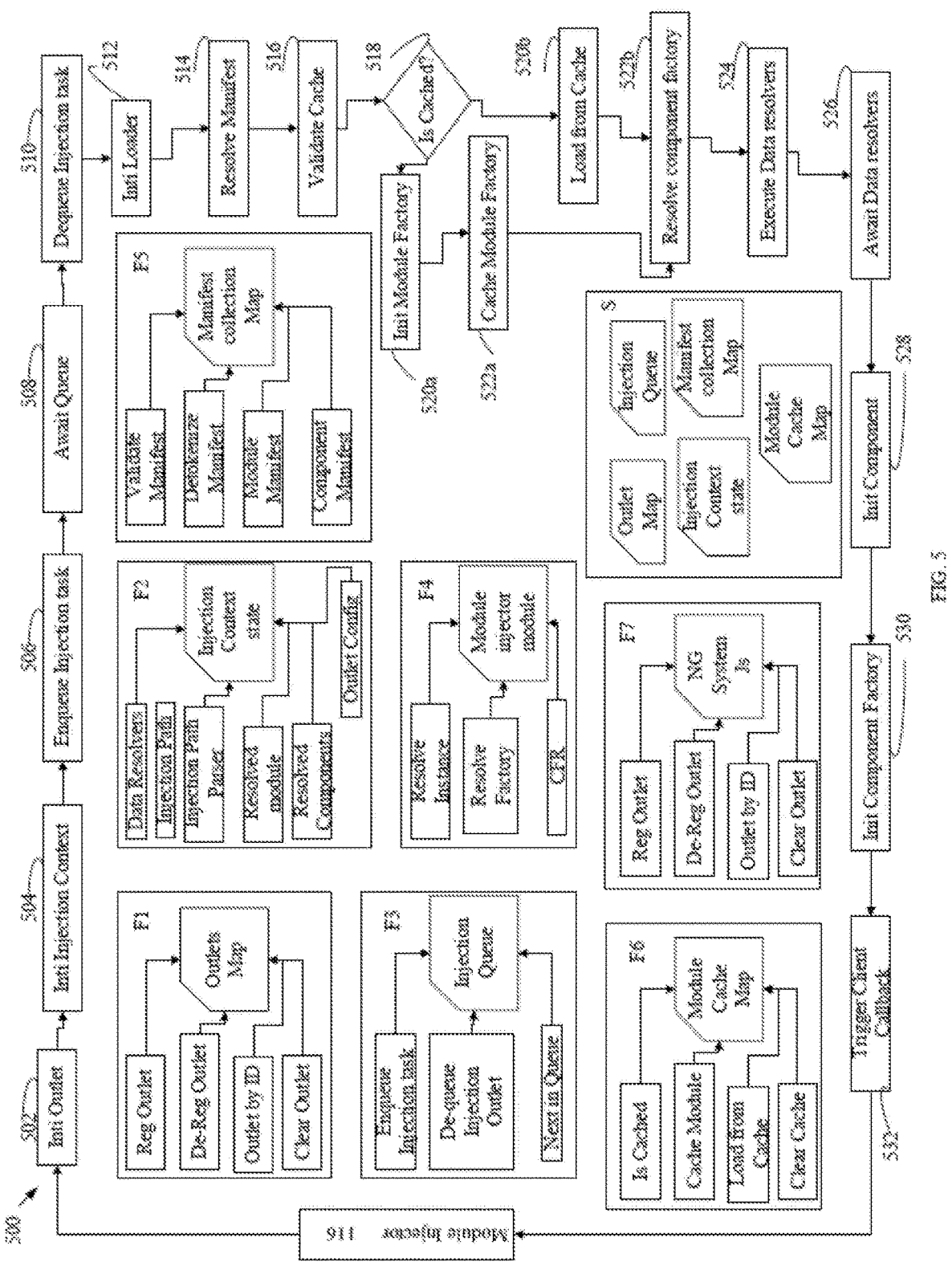
FIG. 5 shows a flow diagram depicting processing of data by a dynamic module injector to restructure EA or SCM application in accordance with an embodiment of the present invention.

FIG. 5 is a flow diagram 500 depicting processing of data by dynamic module injector to restructure EA and SCM applications in accordance with an embodiment of the present invention. The triggering of the dynamic module injector 116 initializes outlet in 502 through F1 and outlet maps state S. In 504 injection context is initialized through F2 and injection context state S, in 506 injection task is enqueued through F3 and injection queue state S as part of prioritization of task in case multiple tasks are required to be processed by module injector 116 and if there are multiple tasks then in 508 awaiting queue. In 510 dequeuing injection task through F3 and injection queue state S and in 512 initializing Loader. In 514 resolving manifest through F5 and manifest collection map/parser state S and in 516 validating cache through F6 and module cache map state S. In 518 checking cache, if no, then in 520a initializing module factory and in 522a cache module factory through F7 and router system, else if yes, then in 520b loading from cache through F6 and module cache map state S, further in 522b resolving component factory thorough F7 and router system. In 524 data resolvers are executed through F2 and injection context state S, and in 526 awaiting data resolvers through F7 and router system. In 528 initializing UI component and in 530 initializing component factory through F4 and module injector modules. In 534 triggering client call back.

In an exemplary embodiment, the module factory and component factory enables establishing the path for the identifier to trace the path of the at least one module to be fetched from the repository for loading on the application UI.

In a related embodiment, F1-F7 above define various sub-processes carried out by the dynamic module injector for implementing the overall task of loading at least one module on the application UI. Each of the sub processes and the state are essential for identification of the at least one module through an identifier and creating the UI component on the interface for restructuring the EA and SCM application.

Figure 6:
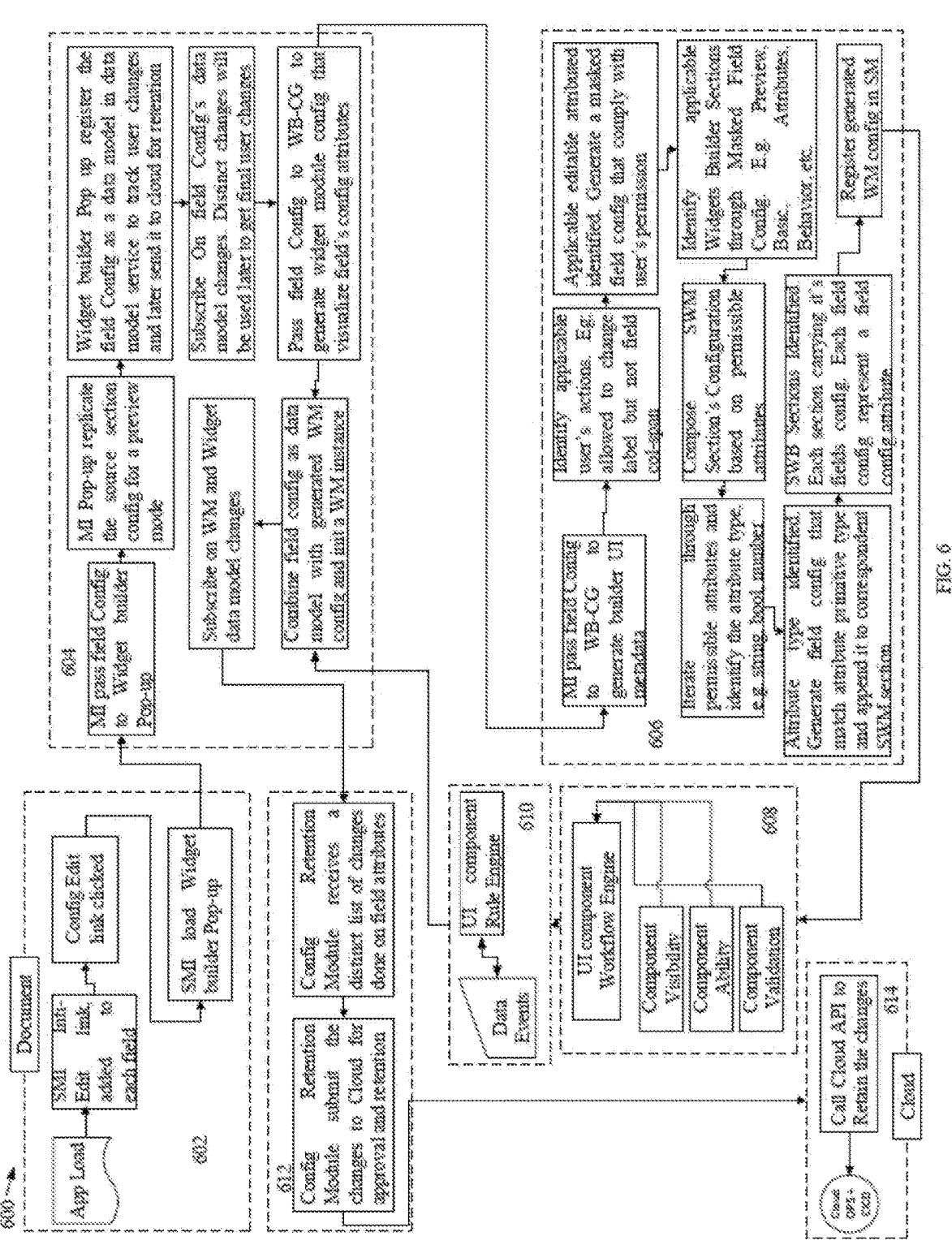
FIG. 6 shows a Widget builder platform as a field of field UI builder system with multiple modules and flows in accordance with an embodiment of the present invention.

Referring to FIG. 6 a Widget builder platform as a field of field UI builder system with multiple modules and flows is provided in accordance with an embodiment of the present invention. It is a platform package that allow admin\super-user\end-user to build and customize the application look and behavior. Through Widget builder platform, users can change the field label, behavior [e.g. width] and attributes [e.g. visibility] as well as adding new widgets and fields and link these fields to external data models. The process flow includes injection of edit link if user\admin are authorized to edit form configuration in 602. When link is clicked MI load popup. In 604 Widgets Builder pass the field to config generation module to generate fields metadata for applicable\authorized attributes. In 606 WB Config Generator produces the metadata for a field and it pass the metadata to Workflow engine to determine fields visibility. In 608 once workflow engine finalizes the rules, it will pass the metadata to rules engine to verify field rules. In 610 rules engine finalize the rules check and pass the composed config back to SWB popup and await user changes. In 612 once the user finalizes their changes, WB popup will produce series of changes and send it to retention module. In 614, WB Retention module will submit changes to cloud for approval and then retention and finally for composition and regeneration.

In an embodiment, the metadata includes a Layout Metadata, Workflow metadata, Validation metadata, pluggable packages and modules metadata, application metadata, configurable data source metadata. The Layout metadata describes how a layout of an app will be rendered, using which UI elements. The workflow Metadata describes how UI elements will mutate its state based on the current application status. The Validation Metadata describes that the data model associated with a given UI Element should be validated. The Pluggable Packages & Modules Metadata carries a map of supported JS Modules (DEV/AOT) acting as a local Unpackaged gallery. The application Metadata describes app structure and rules defined by application admin user and it's different from a layout metadata. The Configurable Data Source Metadata describes the applicable data endpoints for a given application or shared across apps.

Figure 6A:
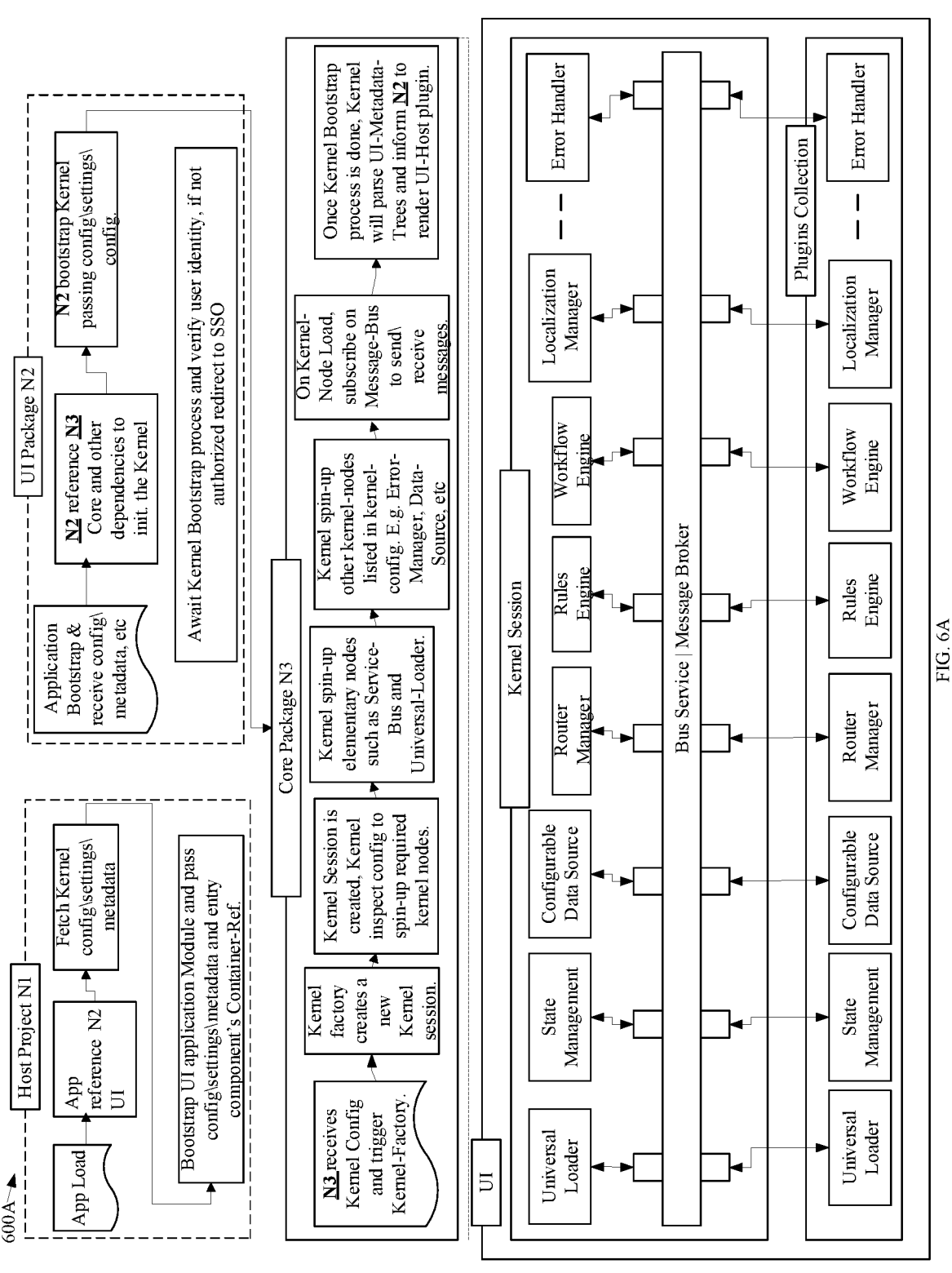
FIG. 6A shows plugins through messaging bus pattern in accordance with an embodiment of the present invention.

In an embodiment, the configurable data sources feed of the system is responsible to abstract external data fetch/retention activities and introduce a metadata driven compassable data feed. The source shall be consumed by other core packages or plugins through massaging bus pattern 600A as shown in FIG. 6A. The messaging bus pattern includes node N1 as Host project that reference and invoke node "N2" UI Package. Host Project should NOT contain any logic, it is meant to deliver config\settings\metadata to N2. Node N2 is the UI package meant to combine plugins collection and kernel, also it shall host none-pluggable modules. Node N3 is a core package meant to control\manage low-level activities, such as Service-Bus, Universal-Loader, State-Management, etc. Kernel nodes must not be accessible to plugins\workspace\host instead communications happen through Service-Bus. Feeds receive a predefined massage structure to trigger a Data Source, merge data feeds when needed, message data and inform consumer when data is available, optionally resolved data could be registered in a state management repository for future data manipulation.

In an advantageous aspect, the configurable data source and the system of the present invention enables exposure of easy to use interface and APIs, handling of all data fetch/retention scenarios, accepting/parsing/execution of metadata that represent fetch/retention activities, incorporation of necessary reactive operators e.g to fork-join, concatenate reactive events, querying for a previously registered data source feed and if not expired then serve it from store management, resolution of dependency feeds e.g if Supplier details feed require some data from basic details feed which is not currently loaded, the Configurable data source fetches dependency feeds before triggering the original feed, interception of the fetch/retention activities and appending JWT token required to communicate with API's, application of multiple data manipulations through pluggable data massagers, notifying entities with the stats of their requests by sharing the message status e.g request received fetching, merging, massaging, completed etc. The configurable data source further enables determination of an expiration window for active feeds and refresh the data when feed expires, communication with a store management microkernel node to retain/operate on feeds, monitoring data fetch/retention activities for performance, error handling and statistical information.

In an exemplary embodiment, external APIs are triggered in server side to avoid sending sensitive tokens to front-end [E.g tokens to communicate with other APIs]. The configurable data source implementation enables automation of data fetch/detection activities through metadata, reduction in efforts by eliminating the need of coding to fetch/retain data and enforcement of standards by providing set of unified messages to fetch/transform/mutate/retain data.

Figure 7:
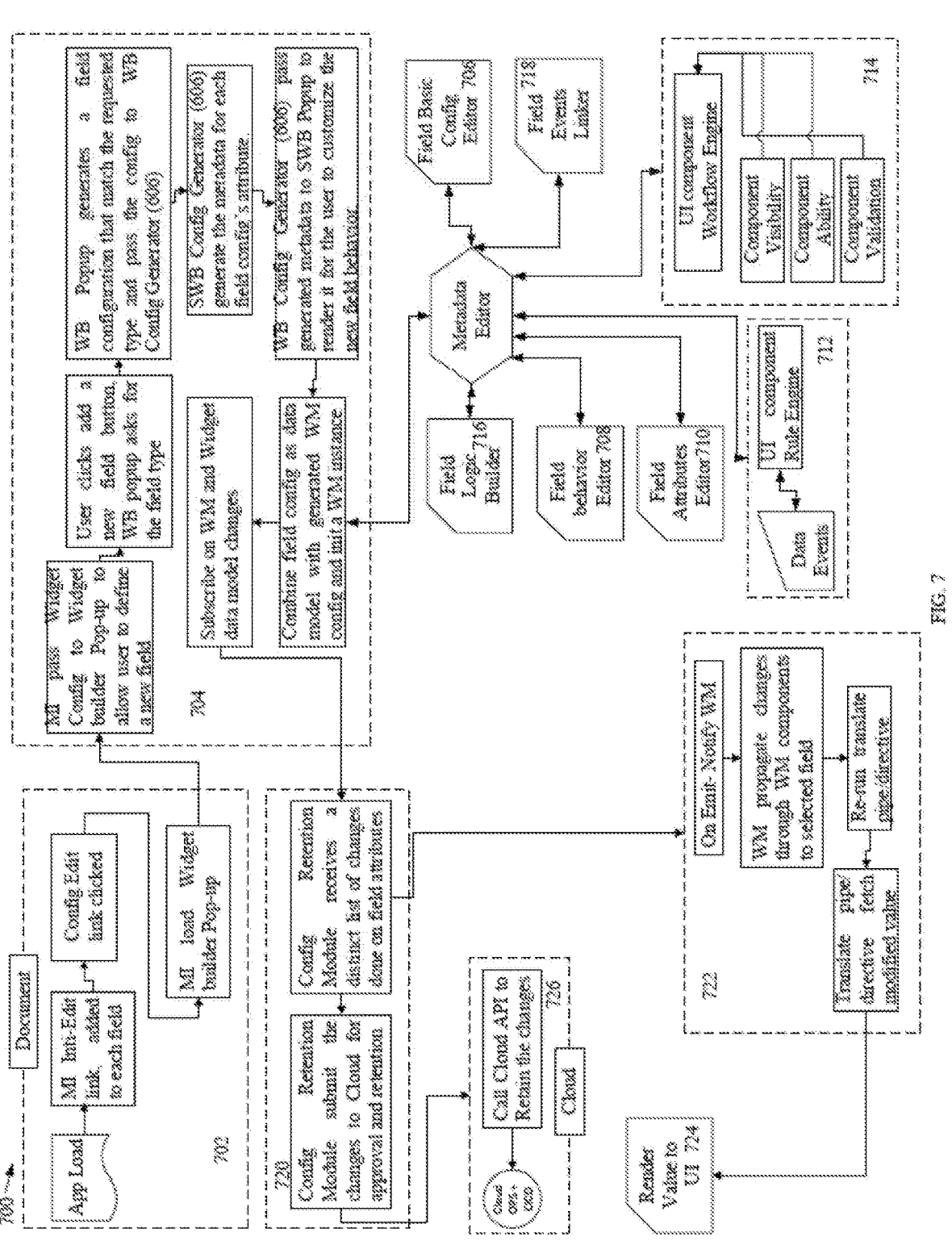
FIG. 7 shows the widget builder platform with multiple modules and process flow for adding a field on an application UI in accordance with an embodiment of the present invention.

Referring to FIG. 7, in an example embodiment, a widget builder platform with multiple modules and process flow for adding a field on an application UI is provided in accordance with an embodiment of the present invention. The process flow includes injection of edit link if user\admin are authorized to edit form configuration in 702. When link clicked SMI load popup. In 704 Config dispatcher is dividing related config metadata into sections and send the generated metadata to appropriate editor. In 706 basic Config editor is responsible to edit basic configuration such as Id, label, etc. In 708 a behavior editor is responsible to edit field behavior and how it will appear on screen. In 710 attributes Editor is responsible to edit field attributes such as ability and visibility. In 712 a Rules Editor is responsible to define the rules related to new field. In 714 a Workflow Editor is responsible to link generated field with corresponding business rules. In 716, a Logic builder is where admin could define the business logic to be executed in certain events. In 718 an events linker is linking a field event such as change or select to a pre-defined business logic. In 720 Listen for admin activities and changes on Builder and keep track of changes being done for retention. In 722 when admin finalized all the changes, Config Retention module will notify Widgets Manager to reflect the changes. In 724 widgets Manager propagate the changes through child components and add the new field to the application UI/(DOM). In 726 distinct changes will be submitted to the cloud for composition, regeneration and retention.

Figure 8:
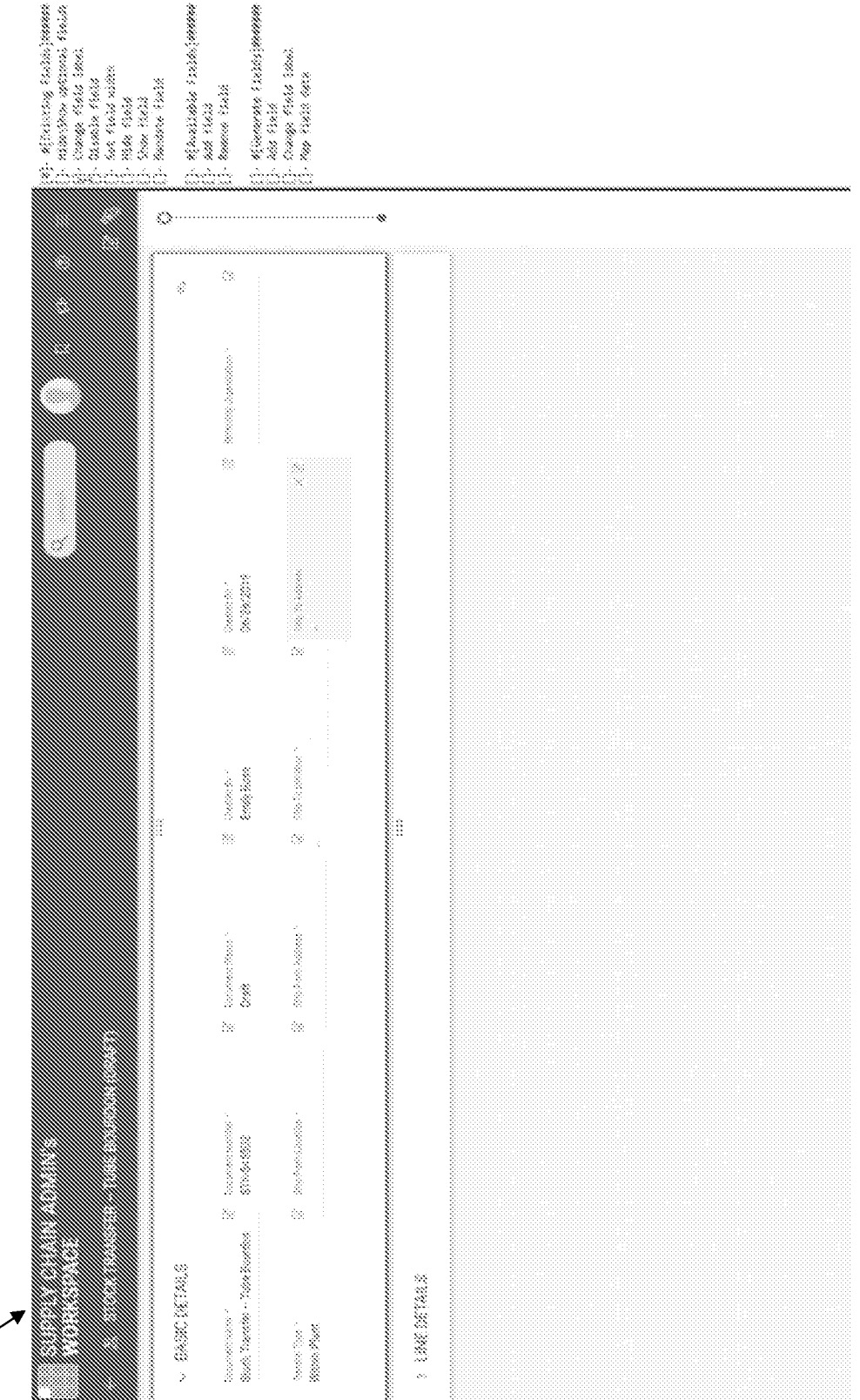
FIG. 8, 8A-8E shows configurable user interface for adding fields to an application UI and restructuring the application in accordance with an embodiment of the present invention.
Figure 8A:
Figure 8B:
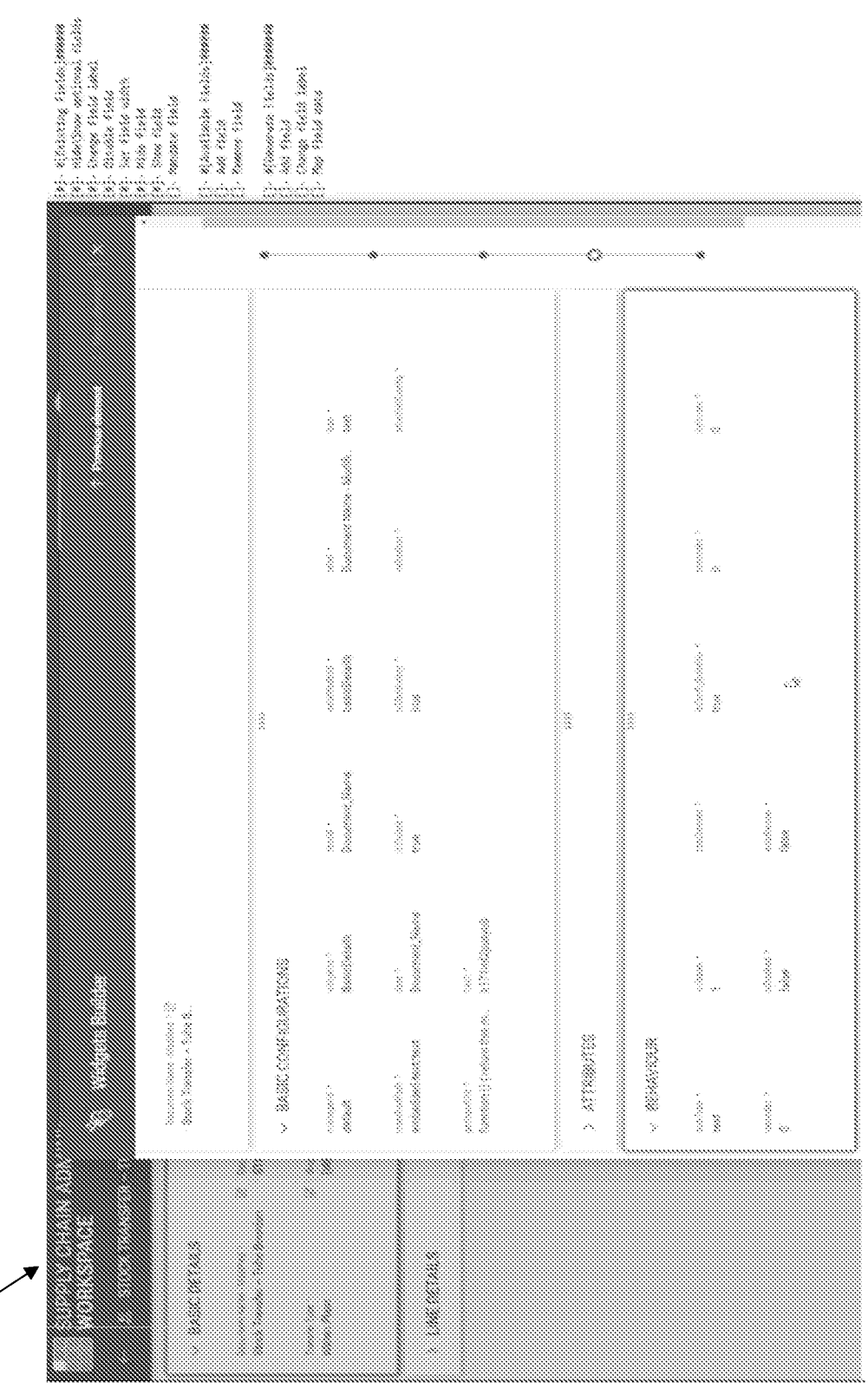
Figure 8C:
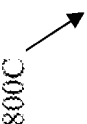
Figure 8D:
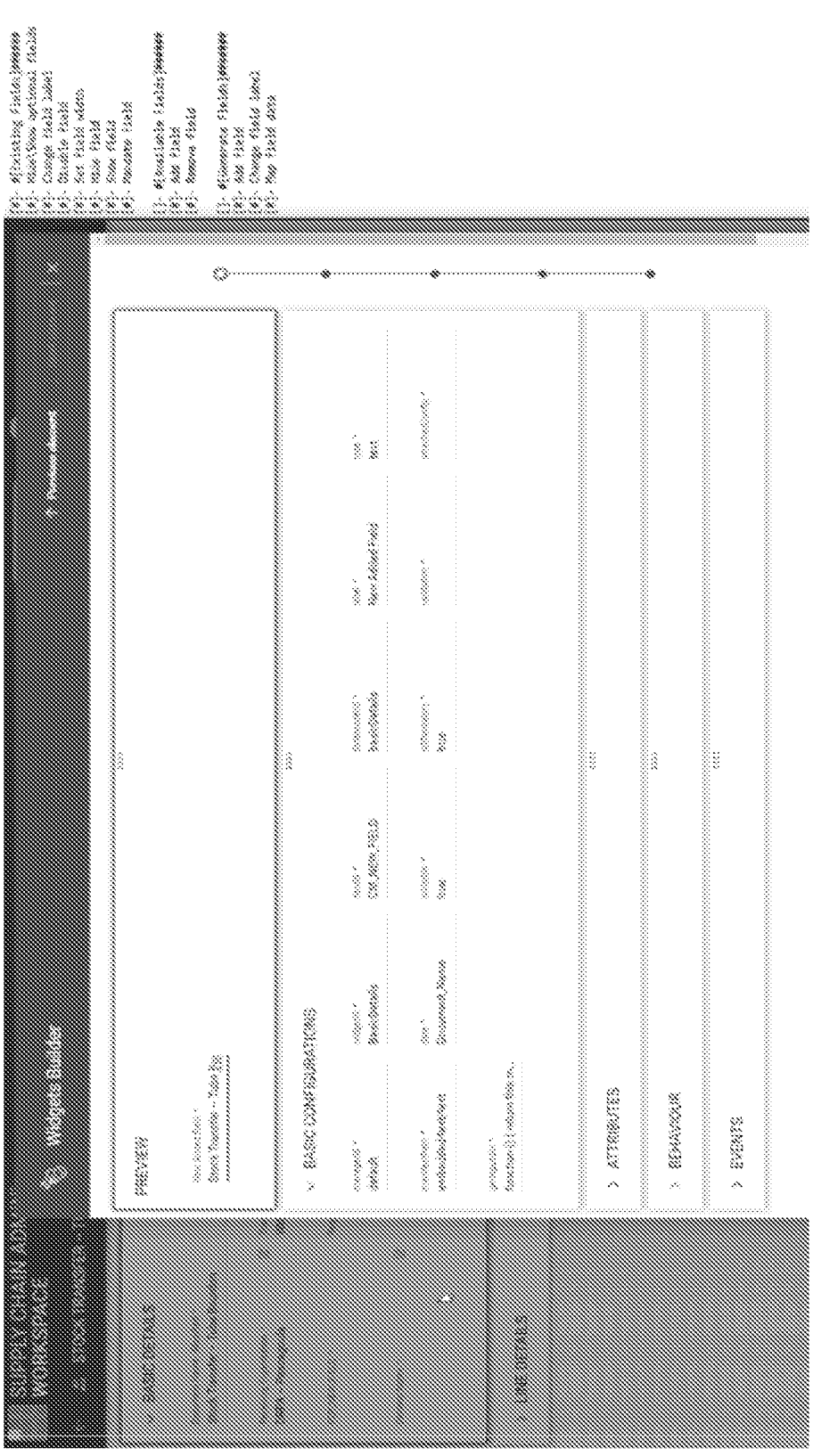
Figure 8E:
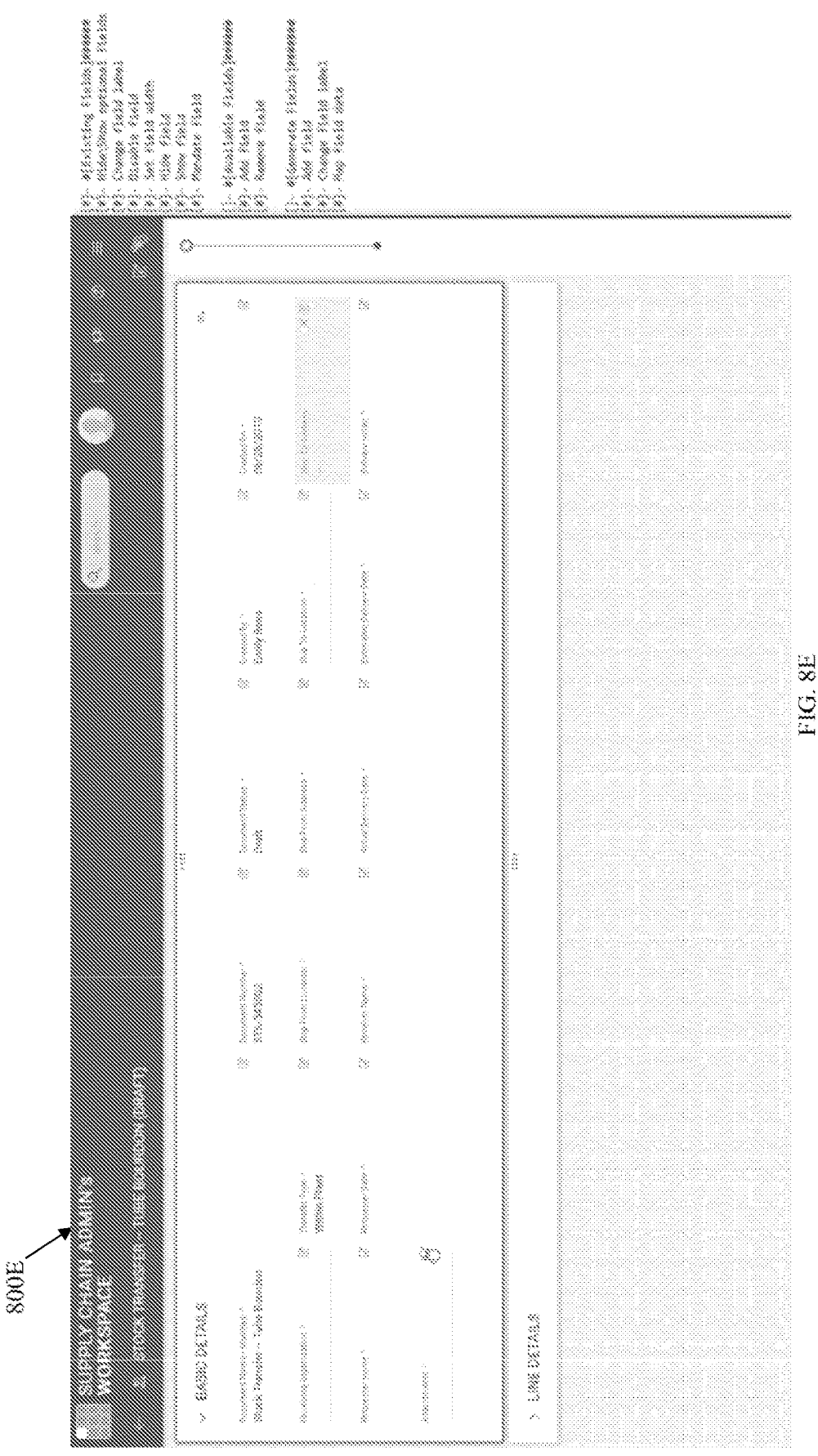

Referring to FIG. 8 a widget builder application user interface 800 is shown in accordance with an embodiment of the repent invention. In an example embodiment referring to FIG. 8A-8E, a widget builder with multiple modules for adding fields on an application UI is provided in accordance with an embodiment of the present invention. The Widget builder provides options of hide/show optional fields on the interface, change field label, disable field, set field width, hide field, show field, mandate field. Further the widget builder provides add field or remove field from available field options. Also, the builder provides option of generating new fields not defined earlier by add field, change field label or map field label. Referring to FIG. 8A, the UI screen 800A providing option to work on attributes like change field label or disable field is shown. In FIG. 8B, the UI screen 800B providing option to work on behavior like set field width, hide field, and show field is shown. In FIG. 8C, the UI screen 800c providing option to add fields from existing or available fields through fields picker tool is shown. In FIG. 8D the UI screen 800d providing option to generate new fields not defined earlier is shown. As can be seen, the User can create completely new fields which are dynamically created based on the requirement of the supply chain operation. The application does not depend on changes to be made to the structure by a developer as the application is structured with seeded mapping to accommodate any additional fields in real time. In FIG. 8E, the UI screen 800E shows newly added field as "sssssssss", which also modifies the document name to "ssssssss", i.e it creates a new field dynamically depending on the requirement of the user.

In one example embodiment, a supplier data component is added as a parameter on the application interface to be considered for carrying out a SCM or EA function. The component includes at least one attribute of the supplier data amongst (Vendor name, firmographic attributes such as City, address, operating countries, number of employees, financials, products or services offered etc) or other attributes of the supplier such as average lead time for delivery etc, from the received supplier data component. This component may impact other modules/functions of the applications and may need to be considered for those as well. Further, any change in the process flow of any of the modules/functions of the application due to additional component is extremely difficult to track which leads to delayed actions. The system of the present invention enables, restructuring of the application reflecting the added component across other modules/functions that may be impacted or needs to consider it for execution. Further, the restructuring is also considered in the ML (machine learning) models driving specific actions in real-time. In case the supplier is a critical supplier who supplies specific materials critical to the manufacturing line operations, restructuring would be very critical. If the system senses that the deliveries of this supplier have been consistently delayed over the last 3-4 cycles and these changes are used by the data models or machine learning algorithms to determine the new lead time for the specific products, then this insight is extremely valuable to the organization in many ways to take action or perform tasks based on recommendation. In such a scenario, other functions of the applications may absorb the additional component to mitigate the risks, adjust the process with refreshed lead times or adjust inventory with new forecasts etc.

In exemplary embodiment, each of the plurality of machine learning (ML) models are built on real time data across all data points in the data store, with multiple predictor attribute. This leads to models with higher degree of accuracy and confidence.

In an embodiment, if there are any new data fields from new sources of data being added on the interface, auto-ML will be triggered to conduct the entire process of exploratory data analysis, model building and deployment using module injector.

In an exemplary embodiment, the system and method of the present invention provides multiple ML models (different techniques) for the same use case scenario. At any point in time, there's one model that is operational or deployed for a given use case scenario, but the other models are constantly being refreshed and monitored for better metrics of performance. The models can be switched easily.

Figure 9:
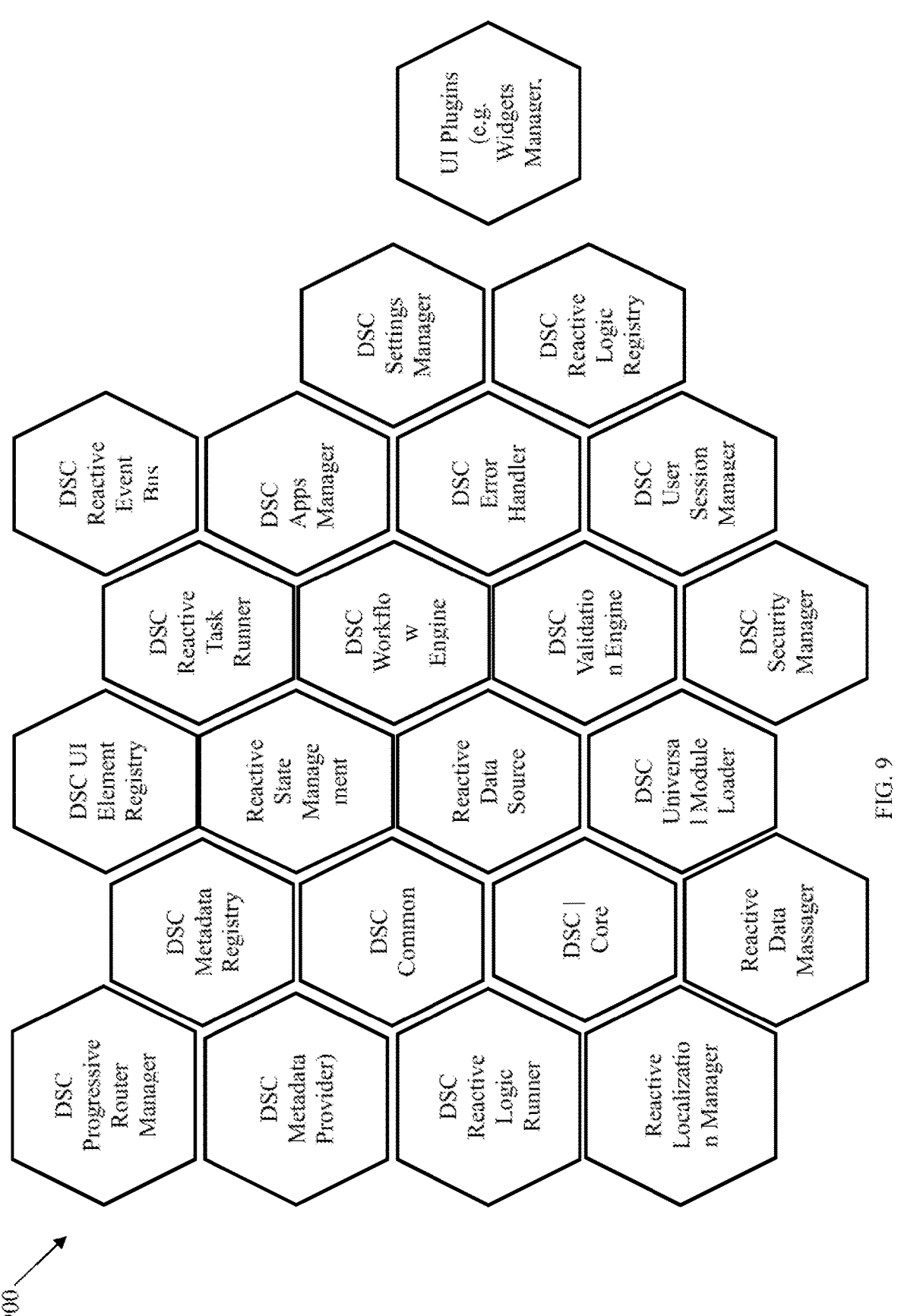
FIG. 9 shows a core modules architecture for EA or supply chain management application in accordance with an embodiment of the present invention

Referring to FIG. 9, a core modules architecture 900 for supply chain management application is provided in accordance with an embodiment of the present invention. The architecture shows multiple modules for implementation of UI plugins to restructure an EA or SCM application. The architecture includes modules including a progressive Router Manager that dynamically Extends Route Tree, Metadata Provider, Reactive Logic Runner (Evens driven business logic runner), Reactive Localization Manager, Metadata Registry, DSC (Data source configurator) Common, DSC core, Reactive data manager, UI elements registry, Reactive state management, Reactive data source, Universal module loader, Reactive Task Runner that Emit Actions or Events as Tasks, workflow engine, validation engine, Security manager for authentication and permissions, reactive events bus for channel service, application Manager apps including state, switcher, app hibernate, Error handler, User session manager for authorization and permissions, settings manager, Reactive Logic Registry that register and execute external pure functions.

Various computing devices referred to as the entity machines, server, processor etc. of the present invention are intended to represent various forms of digital computers, such as laptops, desktops, workstations, personal digital assistants, and other appropriate computers. Computing devices of the present invention further intend to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this disclosure.

In an exemplary embodiment, the present invention mechanism enables extending of the application without modifying the core application code. It enables building an extensible dynamic pluggable enterprise angular application. In terms of functioning, the Plugins are configured to follow some SCM convention to work. The plugins are discoverable and usable by any sub-application of the EA or SCM application. The plugin declares that it is located in a particular directory with the Config/metadata identifying it. Also, a plugin can be one-way, with the SCM application calling out to the plugin and there can be limited data available to the plugin this way which is quite secure on account of the restricted information. The plugin will communicate with other plugins through frontend-Message-Broker service.

In an exemplary embodiment, the system of the present invention includes Platform as a Service layer that allows an architecture team and an application platform team to develop low-level common functionalities to serve other layers. Also, the system includes Software as a Service layer that provide means and tools to less experienced developers and TSO to define reuse pluggable UI Elements\Logic. The application framework provides easy to use, graphical interface to generate applications utilizing predefined layout\plugins and operational logic.

In an advantageous aspect, the system includes complete enterprise and supply chain management capabilities including Real time demand planning form outside to inside (using external and historical data sources), Production and Inventory Planning using demand, production and supplier data sources; Supply planning based on connecting real time demand with suppliers, Warehousing planning and optimization of warehouse spaces for productivity and safety, Logistics planning with full optimization capability based on demand, supplier and network route data. The system has full operational capability where different users from different organizations can come and conduct their workflows, approvals and issue work orders, purchase orders, requisitions, etc. by restructuring their interface as per changing operational requirement of their respective organization.

In another advantageous aspect, the pluggable system Architecture provides Extensibility, parallel application development, simplicity and release simplification. The functionality is dynamically extended to include new features or applications as part of the system. Moreover, since features are implemented as separated configurable components, they are developed parallelly by different units thereby enabling faster development of the application. The plugins are clear in scope enabling easy configuration and development. Moreover, in case of a faulty plugin, it can be fixed and released without requiring the entire application to be released separately.

In yet another advantageous aspect, the messaging architecture of the system enable asynchronous communication, which means that the endpoints that are producing and consuming messages interact with the queue, not each other. Producers can add requests to the queue without waiting for them to be processed. Consumers process messages only when they are available. No component in the system is ever stalled waiting for another, optimizing data flow. Furthermore, the system enables Simplified Decoupling as message queues remove dependencies between components and significantly simplify the coding of decoupled applications. The system components aren't weighed down with communications code and can instead be designed to perform a discrete function.

Exemplary embodiments of the present invention may be a system, a method, and/or a computer program product. The computer program product may include a computer readable storage medium (or media) having computer readable program instructions thereon for causing a processor to carry out aspects of the present invention including but not limited to processing protocols, determining triggering a dynamic module injector, restructuring the application etc. The media has embodied therein, for instance, computer readable program code (instructions) to provide and facilitate the capabilities of the present disclosure. The article of manufacture (computer program product) can be included as a part of a computer system/computing device or as a separate product.

The computer readable storage medium can retain and store instructions for use by an instruction execution device, for example, it can be a tangible device. The computer readable storage medium may be, for example, but is not limited to, an electromagnetic storage device, an electronic storage device, an optical storage device, a semiconductor storage device, a magnetic storage device, or any suitable combination of the foregoing. A non-exhaustive list of more specific examples of the computer readable storage medium includes the following: a hard disk, a random access memory (RAM), a portable computer diskette, a read-only memory (ROM), a portable compact disc read-only memory (CD-ROM), an erasable programmable read-only memory (EPROM or Flash memory), a digital versatile disk (DVD), a static random access memory (SRAM), a floppy disk, a memory stick, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the internet, a local area network (LAN), a wide area network (WAN) and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

The foregoing is considered as illustrative only of the principles of the disclosure. Further, since numerous modifications and changes will readily occur to those skilled in the art, it is not desired to limit the disclosed subject matter to the exact construction and operation shown and described, and accordingly, all suitable modifications and equivalents may be resorted to that which falls within the scope of the appended claims.

The invention claimed is:

1. A system associated with a user interface (UI) application framework for restructuring of an enterprise or supply chain management (SCM) application comprising:

a processor, and a memory, coupled to the processor storing instructions that when executed by the processor calls the processor to receive through a configurable user interface (UI) layer, an input from a user to accomplish at least one task:

trigger a field layer through the configurable UI layer for accomplishing the at least one task wherein the field layer includes a data layer component and a platform layer component;

store at a data repository, a plurality of metadata and data models associated with a set of protocols generated by an artificial intelligence (AI) engine based on an AI based processing logic to execute the at least one task, wherein the protocols are backend scripts created by a bot based on the at least one task, the plurality of metadata, data models and AI processing for enabling execution of the at least one task thereby restructuring the application, identify, by a persistence layer, dependencies between a plurality of data attributes associated with the application to provide recommendation to the user; and trigger an application programming interface (API) configured to interact with the configurable UI layer, the data repository, the persistence layer and the field layer for restructuring the application, wherein the AI based processing logic integrates deep learning, predictive analysis, information extraction and robotics for triggering a dynamic module injector to conditionally load at least one module on an application UI thereby processing the task.

2. The system of claim 1, wherein the persistence layer provides recommendations to the user during a follow up operation as the layer captures and retains logs for UI components selected by the user for creating any document related to enterprise or SCM operation to restructure the application.

3. The system of claim 1, wherein the dynamic module injector is configured for initialization of outlet, initialization of injection context, injection of queuing the task, initialization of a loader, manifesting of a parser and module cache mapping for conditionally loading the at least one module.

4. The system of claim 1, wherein the AI engine generates the protocols based on AI based processing logic that integrates deep learning, predictive analysis, information extraction and robotics for triggering a dynamic module injector to conditionally load at least one module on an application UI thereby processing the at least one task.

5. The system of claim 4, wherein the AI engine is a rule creator engine that generates protocols based on the at least one task and an enterprise or SCM operation.

6. The system of claim 5, wherein the rule creator engine is a graphical tool that enables the user to create and modify validation and workflow rules for the application and define custom rules in real time as per transformational requirements.

7. The system of claim 1, wherein the at least one task includes addition of a functional UI component on the UI application wherein the functional UI component is a dynamic component created by the user based on any additional functionality or parameter to be considered for running the application.

8. The system of claim 1, wherein the at least one task includes embedding templates for restructuring the application wherein the templates are related to sourcing, procurement or supply chain functions.

9. The system of claim 1, wherein the at least one task includes modification of an existing UI component on the application for accommodating transformations required based on new operational requirement for the application.

10. The system of claim 9, wherein the at least one task includes configuring labels in multi languages of form elements and publish the labels on the application to start leveraging operational forms including Purchase Order, Contract and Inventory.

11. A system for restructuring of an enterprise or supply chain management (SCM) application, the system comprises:

an entity machine configured to initiate at least one task to be performed for restructuring the enterprise or supply chain application;

an application server configured to receive input from the entity machine, the application server having a micro-frontend support architecture including a User Interface (UI) framework for restructuring the enterprise or supply chain application, depending on the type of input received from the entity machine, the framework comprising a configurable UI layer for receiving input from a user to accomplish a task;

a field layer including a data layer component and a platform layer component wherein the field layer is triggered through the configurable UI layer for accomplishing the at least one task;

a data repository for storing a plurality of metadata and data models associated with a set of protocols generated by an artificial intelligence (AI) engine based on an AI based processing logic to execute the at least one task wherein the protocols are backend scripts created by a bot based on the at least one task, the plurality of metadata, data models and AI processing for enabling execution of the at least one task thereby restructuring the application;

a persistence layer configured for identifying dependencies between a plurality of data attributes associated with the application to provide recommendation to the user; and an application programming interface (API) configured to interact with the configurable UI layer, the data repository, the persistence layer and the field layer for restructuring the application, wherein the AI based processing logic integrates deep learning, predictive analysis, information extraction and robotics for triggering a dynamic module injector to conditionally load at least one module on an application UI thereby processing the task.

12. The system of claim 11, wherein the persistence layer provides recommendations to the user during a follow up operation as the layer captures and retains logs for UI components selected by the user for creating any document related to enterprise or SCM operation to restructure the application.

13. The system of claim 11, wherein the AI engine generates the protocols based on AI based processing logic that integrates deep learning, predictive analysis, information extraction and robotics for triggering a dynamic module injector to conditionally load at least one module on an application UI thereby processing the at least one task.

14. The system of claim 13, wherein the AI engine is a rule creator engine that generates protocols based on the at least one task and an enterprise or SCM operation wherein the rule creator engine is a graphical tool that enables the user to create and modify validation and workflow rules for the application and define custom rules in real time as per transformational requirements.

15. The system of claim 11, wherein the at least one task includes addition of a functional UI component on the UI application wherein the functional UI component is a dynamic component created by the user based on any additional functionality or parameter to be considered for running the application.

16. The system of claim 11, wherein the at least one task includes embedding templates for restructuring the application wherein the templates are related to sourcing, procurement or supply chain functions.

17. The system of claim 11, wherein the at least one task includes modification of an existing UI component on the application for accommodating transformations required based on new operational requirement for the application.

18. The system of claim 17, wherein the at least one task includes configuring labels in multi languages of form elements and publish the labels on the application to start leveraging operational forms including Purchase Order, Contract and Inventory.

19. A method for restructuring of an enterprise or supply chain management (SCM) application, the method comprises:

receiving through a configurable user interface (UI) layer, an input from a user to accomplish a task;

triggering a field layer through the configurable UI layer for accomplishing the at least one task wherein the field layer includes a data layer component and a platform layer component;

storing at a data repository, a plurality of metadata and data models associated with a set of protocols generated by an artificial intelligence (AI) engine based on an AI based processing logic to execute the at least one task wherein the protocols are backend scripts created by a bot based on the at least one task, the plurality of metadata, data models and AI processing for enabling execution of the at least one task thereby restructuring the application;

identifying by a persistence layer, dependencies between a plurality of data attributes associated with the application to provide recommendation to the user; and triggering an application programming interface (API) configured to interact with the UI layer, the data repository, the persistence layer and the field layer for restructuring the application, wherein the AI based processing logic integrates deep learning, predictive analysis, information extraction and robotics for triggering a dynamic module injector to conditionally load at least one module on an application UI thereby processing the task.

20. A computer program product for restructuring of an enterprise or supply chain management (SCM) application of a computing device with memory, the product comprising a computer readable storage medium readable by a processor and storing instructions for execution by the processor for performing a method of claim 19.

* * * * *